US012353456B2

(12) United States Patent
Banda

(10) Patent No.: US 12,353,456 B2
(45) Date of Patent: Jul. 8, 2025

(54) SYSTEMS, METHODS, AND APPARATUS FOR CONTEXT-DRIVEN SEARCH

(71) Applicant: Encyclopaedia Britannica, Inc., Chicago, IL (US)

(72) Inventor: Vamsi Krishna Banda, Chicago, IL (US)

(73) Assignee: Encyclopaedia Britannica, Inc., Chicago, IL (US)

( * ) Notice: Subject to any disclaimer, the term of this patent is extended or adjusted under 35 U.S.C. 154(b) by 9 days.

(21) Appl. No.: 17/240,679

(22) Filed: Apr. 26, 2021

(65) Prior Publication Data

US 2021/0334300 A1 Oct. 28, 2021

Related U.S. Application Data

(60) Provisional application No. 63/016,751, filed on Apr. 28, 2020.

(51) Int. Cl.
*G06F 16/334* (2025.01)
*G06F 16/338* (2019.01)
*G06N 3/045* (2023.01)
*G06N 3/08* (2023.01)

(52) U.S. Cl.
CPC ...... *G06F 16/3344* (2019.01); *G06F 16/3347* (2019.01); *G06F 16/338* (2019.01); *G06N 3/045* (2023.01); *G06N 3/08* (2013.01)

(58) Field of Classification Search
CPC ............. G06F 16/3344; G06F 16/3347; G06F 16/338; G06N 3/0454; G06N 3/08; G06N 3/0445
See application file for complete search history.

(56) References Cited

U.S. PATENT DOCUMENTS

2010/0005081 A1 1/2010 Bennett
2012/0110009 A1 5/2012 Kraft et al.
2014/0280088 A1 9/2014 Speer et al.
(Continued)

FOREIGN PATENT DOCUMENTS

KR 101644044 B1 8/2016

OTHER PUBLICATIONS

International Searching Authority, "International Search Report," issued in connection with International Application No. PCT/US2021/029194, Jul. 9, 2021, 3 pages.
(Continued)

*Primary Examiner* — Aleksandr Kerzhner
*Assistant Examiner* — Aryan D Toughiry
(74) *Attorney, Agent, or Firm* — Hanley, Flight & Zimmerman, LLC

(57) ABSTRACT

Systems, methods, and apparatus for context-drive search are disclosed. An example apparatus includes memory to store machine-readable instructions, and at least one processor to execute the machine-readable instructions to at least tokenize text included in a query for content into text portions, encode the text portions into respective vectors, organize the text portions based on natural language similarity of the text portions, the natural language similarity based on the respective vectors, and generate one or more search results based on the organized text portions, and rank the one or more search results for presentation on a computing device.

27 Claims, 16 Drawing Sheets

(56) References Cited

U.S. PATENT DOCUMENTS

| | | | |
|---|---|---|---|
| 2017/0017897 A1 | 1/2017 | Bugay et al. | |
| 2018/0101602 A1* | 4/2018 | Allen | G06F 40/30 |
| 2019/0205402 A1* | 7/2019 | Sernau | G06Q 50/01 |
| 2020/0044955 A1* | 2/2020 | Pugaczewski | H04L 45/66 |
| 2020/0202256 A1* | 6/2020 | Chaudhari | G06F 18/23 |
| 2020/0349161 A1* | 11/2020 | Siddiqui | G06N 5/01 |
| 2021/0141863 A1* | 5/2021 | Wu | G06F 40/30 |
| 2022/0005121 A1* | 1/2022 | Hayward | G06N 3/044 |

OTHER PUBLICATIONS

International Searching Authority, "Written Opinion," issued in connection with International Application No. PCT/US2021/029194, Jul. 9, 2021, 5 pages.

Reimers et al., "Say Goodbye to Irrelevant Search Results: Cohere Rerank Is Here," Cohere, Cohere Blog, May 1, 2023, [https://txt.cohere.com/rerank/] retrieved on Jan. 5, 2024, 15 pages.

* cited by examiner

[¹Elizabeth Cady Stanton, née Elizabeth Cady, (born November 12, 1815, Johnstown, New York, U.S.—died October 26, 1902, New York, New York), American leader in the women's rights movement who in 1848 formulated the first organized demand for woman suffrage in the United States.²

²Elizabeth Cady received a superior education at home, at the Johnstown Academy, and at Emma Willard's Troy Female Seminary, from which she graduated in 1832.³

³While studying law in the office of her father, Daniel Cady, a U.S. congressman and later a New York Supreme Court judge, she learned of the discriminatory laws under which women lived and determined to win equal rights for her sex.³

⁴In 1840 she married Henry Brewster Stanton, a lawyer and abolitionist (she insisted that the word "obey" be dropped from the wedding ceremony)]

['Elizabeth Cady Stanton, née Elizabeth Cady, (born November 12, 1815, Johnstown, New York, U.S.— died October 26, 1902, New York, New York), American leader in the women's rights movement who in 1848 formulated the first organized demand for woman suffrage in the United States.', ~800

'Elizabeth Cady received a superior education at home, at the Johnstown Avademy, and at Emma Willard's Troy Female Seminary, from which she graduated in 1832. While studying law in the office of her father, Daniel Cady, a U.S. congressman and later a New York Supreme Court Judge, she learned of the discriminatory laws under which women lived and determined to win equal rights for her sex.' ~802

~804

'In 1840 she married Henry Brewster Stanton, a lawyer and abolitionist (she insisted that the word "obey" be dropped from the wedding ceremony)'] ~806

FIG. 8

```
                    ┌─ 902                              ┌─ 904
          ┌──────────────────────┐   ┌──────────────────────────────────┐
          │ "Who is Elizabeth Stanton?" │ → │ [0.0131, -0.8513, -0.6347, -0.4997, ........] │
          └──────────────────────┘   └──────────────────────────────────┘
```

┌─ 906
```
{
 "match":{
  "titleName": "Elizabeth Cady Stanton",
  "phrase": "Elizabeth Cady Stanton, nee Elizabeth Cady, (born November 12, 1815,
Johnstown, New York, U.S. died October 26, 1902, New York, New York), American
leader in the womens rights movement who in 1848 formulated the first organized demand
for woman suffrage in the United States.",
        "url": "www.britannica.com/biography/Elizabeth-Cady-Stanton",
 }
},
{
 "match": {
  "titleName": "On This Day – November 12",
  "phrase": "Elizabeth Cady Stanton, American leader in the women's rights movement
who in 1848 formulated the first organized demand for woman suffrage in the United
States. Elizabeth Cady received a superior education at home, at the Johnstown
Academy, and at Emma Willard's Troy Female Seminary, from which she graduated in
1832.",
        "url": "www.britannica.com/on-this-day/Elizabeth-Cady-Stanton",
 }
},
{
 "match": {
  "titleName": "Harriot Eaton Stanton Blatch",
  "phrase": "Lucretia Mott, nee Lucretia Coffin, (born January 3, 1793, Nantucket,
Massachusetts, U.S. died November 11, 1880, near Abington, Pennsylvania), pioneer
reformer who, with Elizabeth Cady Stanton, founded the organized womens rights
movement in the United States.",
        "url": "www.britannica.com/biography/Harriot-Eaton-Stanton-Blatch",
 }
}
]
```

FIG. 9

```
{
  "match":{
    "titleName": "Elizabeth Cady Stanton",
    "phrase": "Elizabeth Cady Stanton, American leader in the women's rights movement who in 1848 formulated the first organized demand for woman suffrage in the United States. Elizabeth Cady received a superior education at home, at the Johnstown Academy, and at Emma Willard's Troy Female Seminary, from which...",
        "url": "www.britannica.com/biography/Elizabeth-Cady-Stanton",
  }
},
{
  "match": {
    "titleName": "On This Day – November 12",
    "phrase": "American activist Elizabeth Cady Stanton, who was a leader in the women's rights movement in 1848 formulated the first organized demand for women's suffrage...",
        "url": "www.britannica.com/on-this-day/November-12",
  }
},
{
  "match": {
    "titleName": "Harriot Eaton Stanton Blatch",
    "phrase": "Harriot Stanton was a daughter of Elizabeth Cady Stanton and early absorbed a reformers zeal from her and from her father, Henry B. Stanton, an....",
        "url": "www.britannica.com/biography/Harriot-Eaton-Stanton-Blatch",
  }
}
]
```

FIG. 10

SYSTEMS, METHODS, AND APPARATUS FOR CONTEXT-DRIVEN SEARCH

RELATED APPLICATION

This patent arises from an application claiming the benefit of U.S. Provisional Patent Application No. 63/016,751, which was filed on Apr. 28, 2020. U.S. Provisional Patent Application No. 63/016,751 is hereby incorporated herein by reference in its entirety. Priority to U.S. Provisional Patent Application No. 63/016,751 is hereby claimed.

FIELD OF THE DISCLOSURE

This disclosure relates generally to information search retrieval and, more particularly, to systems, methods, and apparatus for context-driven search.

BACKGROUND

Typically, database information retrieval relies on keyword-based techniques. Search queries may first be compared against a corpus of documents, and those documents may be ranked based on whether they feature the specific words found in the search queries. These techniques may be successful but can falter when the search corpus does not feature a keyword of interest.

BRIEF DESCRIPTION OF THE DRAWINGS

FIG. 6 depicts example text that can be indexed by the example context search controller of FIGS. 1, 2, and/or 3.

FIG. 7 depicts example vectors that can be generated by the example context search controller of FIGS. 1, 2, and/or 3.

FIG. 8 depicts the example text of FIG. 6 re-organized by the example context search controller of FIGS. 1, 2, and/or 3 based on the example vectors of FIG. 7.

FIG. 9 depicts an example search query, a corresponding example vector, and example information retrieval results generated by the example context search controller of FIGS. 1, 2, and/or 3.

FIG. 10 depicts the example information retrieval results of FIG. 9 ranked by the example context search controller of FIGS. 1, 2, and/or 3.

DETAILED DESCRIPTION

Figure 1:
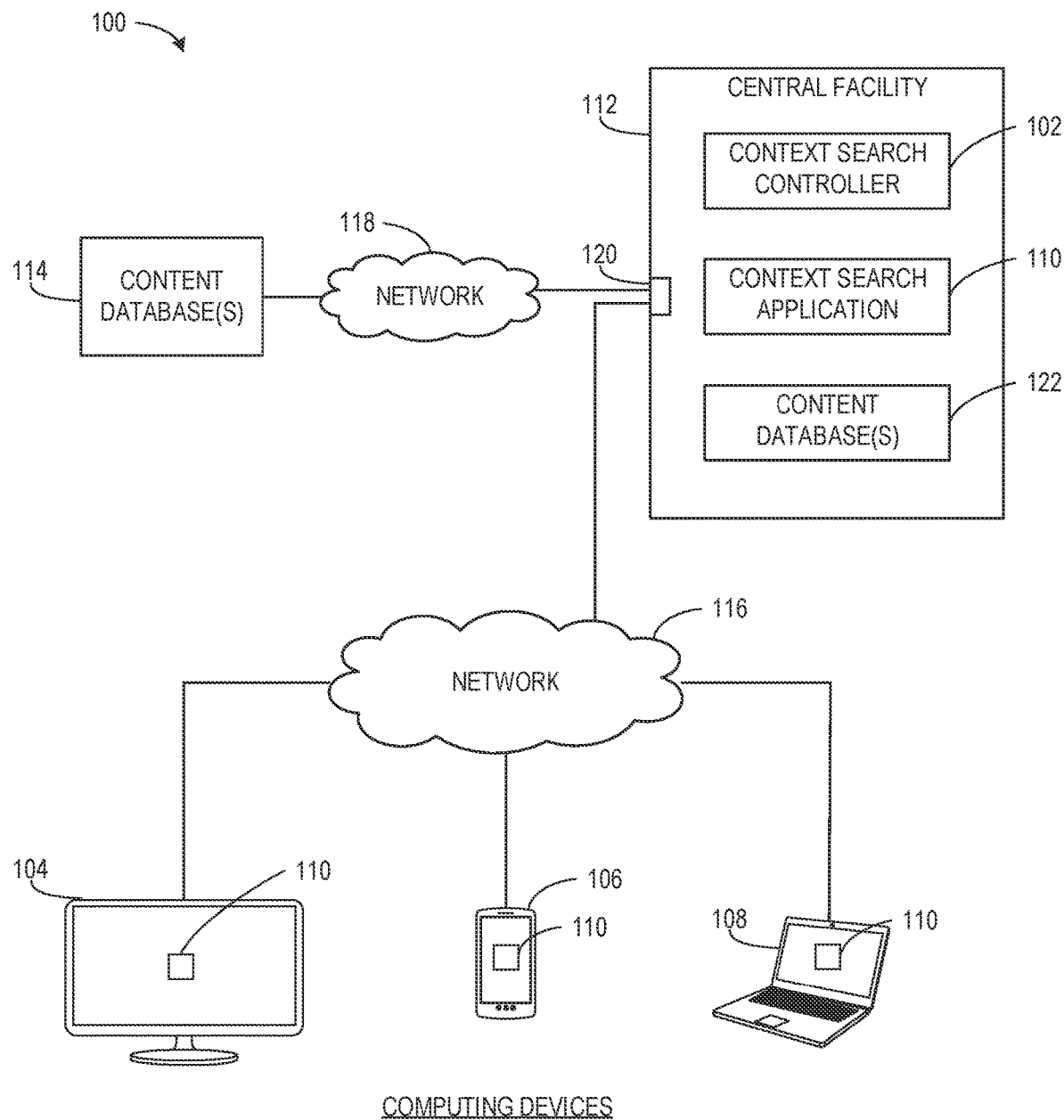
FIG. 1 is an illustration of an example information retrieval environment including an example context search controller to execute search queries from example computing devices and/or distribute an example context search application to the computing devices.

The figures are not to scale. In general, the same reference numbers will be used throughout the drawing(s) and accompanying written description to refer to the same or like parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Typically, information retrieval relies on keyword-based methods. A query (e.g., a search query) is first compared against a corpus of documents, and those documents are then ranked according to whether they feature the specific word(s) found in the query. Components of those documents are then themselves ranked according to these same criteria, namely, whether to what extent they contain the specific word(s) from the query (e.g., to the frequency of those words in other documents).

The Text Frequency, Inverse Document Frequency (TF-IDF) algorithm is the foundation for many keyword-based approaches. TF-IDF can be successful in information retrieval tasks where the information to be retrieved shares many of the same keywords, terms, etc., as the search query, and where the search corpus is homogenous. However, TF-IDF generates undesirable search results and/or otherwise falters when these conditions do not hold. By way of example, a question asking, "When was George Washington born?" may not return the answer, "Mary Ball gave birth to her first son in 1732" due to the lack of shared terms—despite the fact that the latter phrase contains the answer to the question.

Examples disclosed herein include systems, methods, apparatus, and articles of manufacture for context-driven, keyword-agnostic information retrieval. Examples disclosed herein include executing artificial intelligence (AI)-based models and techniques to index searchable content of interest and/or execute information retrieval tasks, such as search result generation and search result ranking.

Examples disclosed herein include a context search controller that can generate, train, and/or execute AI-based model(s), such as an AI-based context search model. In some disclosed examples, the context search controller can index text from content of interest, such as text from an article (e.g., an information article), by tokenizing the text into sentences and encoding the tokenized sentences into first vectors. In some disclosed examples, the context search controller can execute natural language tasks such as text classification, semantic similarity, clustering, etc., on the first vectors to re-organize the sentences based on at least one of their similarity (e.g., natural language similarity) to each other or their context. For example, the context search controller can determine a natural language similarity (e.g., a measure of natural language similarity) of two or more portions of text with respect to each other. In some disclosed examples, the context search controller can encode the re-organized sentences into second vectors (e.g., dense vectors), associate metadata with the dense vectors, and/or store at least one of the vectors, the metadata, or the associations in a database for subsequent information retrieval tasks.

In some disclosed examples, the natural language similarity can be a Cosine Similarity, a Euclidean distance, a Manhattan Distance, a Jaccard Similarity, or a Minkowski Distance. As used herein, "natural language similarity" may refer to a measure of semantic similarity between content or portion(s) thereof (e.g., between two or more sentences, two or more paragraphs, two or more articles, etc.) based on natural language processing and techniques. As used herein, "natural language processing" may refer to computational linguistics (e.g., rule-based modeling of the human language), statistical models, machine learning models, deep learning models, etc., and/or a combination thereof, that, when executed, may enable computing hardware to process human language in the form of text data, voice data, etc., to "understand" the full meaning of the text data, the voice data, etc. In some examples, the full meaning may include the speaker or writer's intent and sentiment (e.g., the intent of a query to an information retrieval system).

Examples disclosed herein include the context search controller to generate search results and/or rank the search results in response to a query. In some disclosed examples, the context search controller tokenizes sentence(s) in the query and converts the tokenized sentence(s) to a first vector (e.g., a first embedding vector). In some disclosed examples, the context search controller executes the AI-based context search model to generate information retrieval results. In some disclosed examples, the context search controller generates, trains, and/or executes an AI-based ranking model that ranks the information retrieval results.

AI, including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network (e.g., a convolution neural network (CNN), an artificial neural network (ANN), a deep neural network (DNN), a graph neural network (GNN), a recurrent neural network (RNN), etc.) model is used. Using a neural network model enables learning representations of language from raw text that can bridge the gap between query and document vocabulary to develop context-based relationships between concepts and/or ideas represented by sentences, paragraphs, etc. In general, ML models/architectures that are suitable to use in the example approaches disclosed herein include Learning-to-Rank (LTR) models/architectures, DNNs, etc., and/or a combination thereof. However, other types of ML models could additionally or alternatively be used such as Long Short-Term Memory (LSTM) models, Transformer models, etc.

In general, implementing an AI/ML system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of AI/ML model and/or the expected output. For example, supervised training uses inputs and corresponding expected (e.g., labeled) outputs to select parameters (e.g., by iterating over combinations of select parameters) for the AI/ML model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the AI/ML model (e.g., without the benefit of expected (e.g., labeled) outputs).

In examples disclosed herein, AI/ML models may be trained using unsupervised learning. However, any other training algorithm may additionally or alternatively be used. In examples disclosed herein, training may be performed until a pre-determined quantity of training data has been processed. Alternatively, training may be performed until example test queries return example test results that satisfy pre-determined criteria, a pre-defined threshold of accuracy, etc., and/or a combination thereof. In examples disclosed herein, training may be performed remotely using one or more computing devices (e.g., computer servers) at one or more remote central facilities. Alternatively, training may be offloaded to client devices, such as edge devices, Internet-enabled smartphones, Internet-enabled tablets, etc. Training may be performed using hyperparameters that control how the learning is performed (e.g., a learning rate, a number of layers to be used in the machine learning model, etc.). In examples disclosed herein, hyperparameters that control tokenization (e.g., sentence tokenization), generation of embedded vectors, text classification, semantic similarity, clustering, etc., may be used. Such hyperparameters may be selected by, for example, manual selection, automated selection, etc. In some examples re-training may be performed.

Such re-training may be performed in response to a quantity of training data exceeding and/or otherwise satisfying a threshold.

Training is performed using training data. In examples disclosed herein, the training data may originate from publicly available data, locally generated data, etc., and/or a combination thereof. Because supervised training may be used, the training data is labeled. Labeling may be applied to the training data by content generators, application developers, end users, etc., and/or via automated processes.

Once training is complete, the model is deployed for use as an executable construct that processes an input and provides an output based on the network of nodes and connections defined in the model. The model may be stored at one or more central facilities, one or more client devices, etc. The model may then be executed by the one or more central facilities, the one or more client devices, etc.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some disclosed examples, input data may undergo pre-processing before being used as an input to the machine learning model. Moreover, in some disclosed examples, the output data may undergo post-processing after it is generated by the AI model to transform the output into a useful result (e.g., a display of data, an instruction to be executed by a machine, etc.).

In some disclosed examples, output of the deployed model may be captured and provided as feedback. By analyzing the feedback, an accuracy of the deployed model can be determined. If the feedback indicates that the accuracy of the deployed model is less than a threshold or other criterion, training of an updated model may be triggered using the feedback and an updated training data set, hyperparameters, etc., to generate an updated, deployed model.

FIG. 1 is an illustration of an example information retrieval environment 100 including an example context search controller 102 to execute search queries from example computing devices 104, 106, 108. In this example, the context search controller 102 can distribute an example context search application 110 to one(s) of the computing devices 104, 106, 108 from an example central facility 112. The information retrieval environment 100 of the example of FIG. 1 includes first example content database(s) 114, a first example network 116, and a second example network 118.

In the illustrated example of FIG. 1, the central facility 112 includes the context search controller 102, the context search application 110, and second example content database(s) 122. In some examples, the context search controller 102 generates, trains, and/or deploys one or more AI/ML models. In some such examples, the one or more AI/ML models can generate and/or otherwise output search results in response to a query (e.g., a query for information from a data repository or other storage construct) from one(s) of the computing device(s) 104, 106, 108, from a user operating and/or otherwise associated with the computing device(s) 104, 106, 108, etc. In some such examples, the one or more AI/ML models can rank the search results. For example, the context search controller 102 can generate a first AI/ML model that, when executed, can generate search results in response to a query. In some examples, the context search controller 102 can generate a second AI/ML model that, when executed, can rank the search results (e.g., use the search results from the first AI/ML model as input(s) to the second AI/ML model). In some such examples, the second AI/ML model can rank the search results based on training data obtained from the first content database(s) 114 and/or the second content database(s) 122. For example, the first AI/ML model and/or the second AI/ML model can be implemented by the context search model 200 described below in connection with FIG. 2.

The central facility 112 of the illustrated example may be implemented by one or more servers (e.g., computer servers). In some examples, the central facility 112 can obtain search queries from one(s) of the computing devices 104, 106, 108 and/or training data from the first content database(s) 114. In some examples, the central facility 112 can generate unranked or ranked search results in response to the search queries. The central facility 112 can generate machine-readable executable(s). For example, the central facility 112 can generate the context search application 110 as one or more machine-readable executables. For example, the context search application 110 can be implemented by one or more libraries (e.g., one or more dynamic link libraries (DLLs)), a software development kit (SDK), one or more application programming interfaces (APIs), etc., and/or a combination thereof. In some examples, the central facility 112 can deploy and/or otherwise distribute the machine-readable executable(s) to one(s) of the computing device(s) 104, 106, 108.

In some examples, the central facility 112 can invoke the context search controller 102 to generate, train, and/or deploy AI/ML model(s). In some such examples, the central facility 112 can compile the AI/ML model(s) and/or other associated firmware and/or software components to generate the context search application 110. In some such examples, the central facility 112 can distribute the context search application 110 to one(s) of the computing device(s) 104, 106, 108.

In the illustrated example, the central facility 112 includes an example network interface (e.g., an Internet interface) 120 to receive Internet messages (e.g., a HyperText Transfer Protocol (HTTP) request(s)). For example, the network interface 120 can receive Internet messages that include search queries from one(s) of the computing device(s) 104, 106, 108, training data from the first content database(s) 114, etc. Additionally or alternatively, any other technique(s) for receiving Internet data, information, messages, etc., may be used such as, for example, an HTTP Secure protocol (HTTPS), a file transfer protocol (FTP), a secure file transfer protocol (SFTP), etc.

In some examples, the network interface 120 implements example means for transmitting one or more search results to a computing device (e.g., via a network). For example, the means for transmitting may be implemented by executable instructions such as that implemented by at least block 1314 of FIG. 13. In some examples, the executable instructions of block 1314 of FIG. 13 may be executed on at least one processor such as the example processor 1412 and/or the example hardware accelerator(s) 1440 of FIG. 14. In other examples, the means for transmitting is implemented by hardware logic, hardware implemented state machines, logic circuitry, and/or any other combination of hardware, software, and/or firmware. For example, the means for transmitting may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, a network interface card (NIC), an interface circuit, etc.) structured to perform the corresponding operation without executing software or firmware, but other structures are likewise appropriate.

The computing devices 104, 106, 108 include a first example computing device 104, a second example computing device 106, and a third example computing device 108. The first computing device 104 is a desktop computer (e.g., a display monitor and tower computer, an all-in-one desktop computer, etc.). The second computing device 106 is an Internet-enabled smartphone. The third computing device 108 is a laptop computer. Alternatively, one or more of the computing devices 104, 106, 108 may be any other type of device, such as an Internet-enabled tablet, a television (e.g., a smart television, an Internet-enabled television, a wireless display, etc.), etc. Although only the first computing device 104, the second computing device 106, and the third computing device 108 are depicted, fewer or more computing devices 104, 106, 108 may be in communication with the first network 116.

In the illustrated example of FIG. 1, the computing devices 104, 106, 108 can be operable to obtain the context search application 110 from the central facility 112 via the first network 116. The computing devices 104, 106, 108 can be operable to execute the context search application 110. For example, the computing devices 104, 106, 108 can obtain a search query (e.g., from a user), execute the context search controller 102 to query the central facility 112 to generate search results in response to the search query, and render the search results on a display of the computing devices 104, 106, 108.

The first network 116 of the illustrated example of FIG. 1 is the Internet. However, the first network 116 may be implemented using any suitable wired and/or wireless network(s) including, for example, one or more data buses, one or more Local Area Networks (LANs), one or more wireless LANs, one or more cellular networks, one or more private networks, one or more public networks, etc. The first network 116 enables the network interface 120, and/or, more generally, the central facility 112, to be in communication with one(s) of the computing device(s) 104, 106, 108.

In some examples, the first content database(s) 114 can be implemented by one or more servers that store data (e.g., datasets) that can be used by the central facility 112 to train AI/ML models. For example, the first content database(s) 114 can include and/or otherwise store the Machine Reading Comprehension dataset (MS MARCO), the DBLP Computer Science Bibliography dataset, or any other publicly available dataset that can be used for machine reading comprehension and/or question-answering applications. In some such examples, the first content database(s) 114 can store and/or otherwise make accessible, available, etc., datasets that can be used as training data by the central facility 112 to train AI/ML models.

The central facility 112 of FIG. 1 includes the second content database(s) 122 to store data (e.g., datasets) that can be utilized to train AI/ML models. For example, the second content database(s) 122 can include and/or otherwise store the MS MARCO, the DBLP Computer Science Bibliography dataset, or any other dataset that can be used for machine reading comprehension and/or question-answering applications. In some such examples, the second content database(s) 122 can store and/or otherwise make accessible, available, etc., datasets that can be used as training data by the central facility 112 to train AI/ML models. In some examples, the second content database(s) 122 can include information, such as one or more general knowledge encyclopedias or portion(s) thereof. For example, the second content database(s) 122 can include articles (e.g., objective articles), biographies, audio records, images, videos, etc., compiled by editors, contributors, etc., associated with any topic (e.g., Entertainment, Geography, Government, Health, History, Law, Lifestyles, Literature, Medicine, Politics, Philosophy, Science, Social Issues, Sports, Technology, Travel, Visual Arts, etc.).

Figure 2:
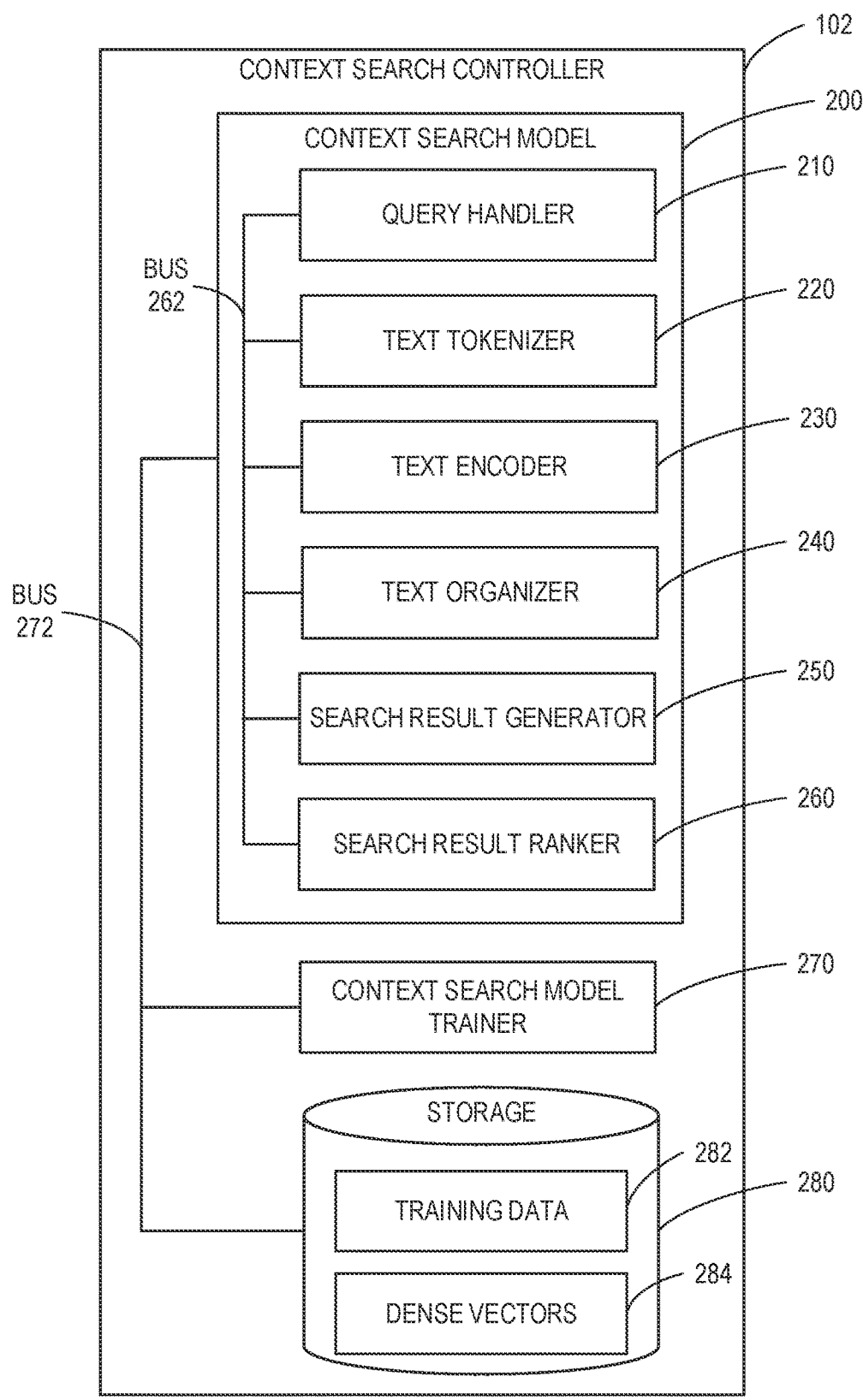
FIG. 2 is an example implementation of the context search controller of FIG.

FIG. 2 is an example implementation of the context search controller 102 of FIG. 1. In some examples, the context search controller 102 indexes searchable content, which can include articles (e.g., information or text-based articles), books, magazines, etc., or any other audio, visual, and/or text-based medium. In some examples, the context search controller 102 generates one or more AI/ML models to search the indexed content and output relevant search results and/or ranked relevant search results.

In the illustrated example of FIG. 2, the context search controller 102 includes an example context search model 200, which includes an example query handler 210, an example text tokenizer 220, an example text encoder 230, an example text organizer 240, an example search result generator 250, and an example search result ranker 260. The context search controller 102 of the example of FIG. 2 includes an example context search model trainer 270 and an example storage 280, which includes example training data 282 and example dense vectors 284. For example, the dense vectors 284 can include and/or otherwise implement vectors in dense representation.

In the illustrated example of FIG. 2, the query handler 210, the text tokenizer 220, the text encoder 230, the text organizer 240, the search result generator 250, and the search result ranker 260 are in communication with one(s) of each other via a first example bus 262. In this example, the context search model 200, the context search model trainer 270, and the storage 280 are in communication with one(s) of each other via a second example bus 272. For example, the first bus 262 and/or the second bus 272 can be implemented by at least one of an Inter-Integrated Circuit (I2C) bus, a Serial Peripheral Interface (SPI) bus, or a Peripheral Component Interconnect (PCI) bus. Additionally or alternatively, the first bus 262 and/or the second bus 272 may be implemented by any other type of computing, communication, and/or electrical bus. In some examples, the first bus 262 and/or the second bus 272 is/are virtualized bus(es).

In the illustrated example of FIG. 2, the context search controller 102 includes the context search model 200 to execute information retrieval tasks based on the context implied by the connotations of word(s) or arrangement of alphanumeric characters included in a search query. For example, the context search model 200 can execute context-driven, keyword-agnostic information retrieval tasks by focusing on the context of the search query irrespective of the specific language the search query contains.

In some examples, the context search model 200 can be implemented by one or more AI/ML models. For example, the context search model 200 can process input data (e.g., a query) to generate an output (e.g., a search result, a ranking of search results, etc.) based on patterns and/or associations previously learned by the context search model 200 via a training process. For example, the context search model 200 can be trained with the training data 282 to recognize patterns and/or associations and follow such patterns and/or associations when processing input data such that other input(s) result in output(s) consistent with the recognized patterns and/or associations. Advantageously, the context search model 200 can enable learning representations of language from raw text that can bridge the gap between query and document vocabulary to develop context-based relationships between concepts and/or ideas represented by sentences, paragraphs, etc. For example, the context search model 200 can include, correspond to, and/or otherwise be representative of, one or more AI/ML models. In some such examples, the context search model 200 can include, correspond to, and/or otherwise be representative of, one or more neural networks (e.g., one or more ANNs, DNNs, GNNs, RNNs, etc., and/or a combination thereof). Additionally or alternatively, the context search model 200 may be implemented by one or more LTR models, LSTM models, Transformer models, etc., and/or a combination thereof.

In the illustrated example of FIG. 2, the context search model 200 includes the query handler 210 to obtain a query from one(s) of the computing device(s) 104, 106, 108 of FIG. 1. For example, the query handler 210 can obtain a query from the first computing device 104. In some such examples, the query handler 210 can obtain an example query (e.g., search query) 902 of FIG. 9 of "Who is Elizabeth Stanton?" In some such examples, the query handler 210 can select text, a portion of text (e.g., a text portion), etc., from the query to process. For example, FIG. 6 depicts example text 600 including a first example sentence 602, a second example sentence 604, a third example sentence 606, and a fourth example sentence 608. In some such examples, the query handler 210 can select one or more of the sentences 602, 604, 606, 608 of the text 600 of FIG. 6 to process.

In some examples, the query handler 210 implements example means for obtaining a query from a computing device (e.g., via a network). For example, the means for obtaining may be implemented by executable instructions such as that implemented by at least block 1102 of FIG. 11 and/or blocks 1202, 1214, and 1218 of FIG. 12. In some examples, the executable instructions of block 1102 of FIG. 11 and/or blocks 1202, 1214, and 1218 of FIG. 12 may be executed on at least one processor such as the example processor 1412 and/or the example hardware accelerator(s) 1440 of FIG. 14. In other examples, the means for obtaining is implemented by hardware logic, hardware implemented state machines, logic circuitry, and/or any other combination of hardware, software, and/or firmware. For example, the means for obtaining may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the context search model 200 includes the text tokenizer 220 to tokenize text, a text portion, etc., associated with a query, content to index, etc. In some examples, tokenization may refer to the act of breaking up a sequence of strings into pieces such as words, keywords, phrases, symbols, or other elements or partitions called tokens. In some such examples, tokens can be individual words, phrases, whole sentences, etc. In some such examples, some characters like punctuation may be discarded from the query. In some examples, the text tokenizer 220 can break or partition text, a text portion, etc., into individual or discrete linguistic units. In some such examples, the text tokenizer 220 can analyze the text 600 of FIG. 6, determine that the text 600 includes four sentences, and break up the text 600 into one(s) of the sentences 602, 604, 606, 608.

In some examples, the text tokenizer 220 implements example means for tokenizing text included in a query for content into text portions. For example, the means for tokenizing may be implemented by executable instructions such as that implemented by at least block 1104 of FIG. 11 and/or block 1204 of FIG. 12. In some examples, the executable instructions of block 1104 of FIG. 11 and/or block 1204 of FIG. 12 may be executed on at least one processor such as the example processor 1412 and/or the example hardware accelerator(s) 1440 of FIG. 14. In other examples, the means for tokenizing is implemented by hardware logic, hardware implemented state machines, logic circuitry, and/or any other combination of hardware, software, and/or firmware. For example, the means for tokenizing may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the context search model 200 includes the text encoder 230 to convert text, or portion(s) thereof, into a vector (e.g., vector representation). In some examples, the text encoder 230 implements a sentence encoder. In some such examples, the text encoder 230 can generate and/or otherwise output embeddings, or fixed-length vectors used to encode and represent text, sentences, etc., in vector notation. For example, the text encoder 230 can convert the text 600 of FIG. 6 into example vector representations 700 of FIG. 7 including a first example vector 702, a second example vector 704, a third example vector 706, and a fourth example vector 708. In some such examples, the first vector 702 can implement an embedding of the first sentence 602 of FIG. 6, the second vector 704 can be an embedding of the second sentence 604 of FIG. 6, the third vector 706 can be an embedding of the third sentence 606 of FIG. 6, and the fourth vector 708 can be an embedding of the fourth sentence 608 of FIG. 6. In some such examples, the text encoder 230 can convert the sentences 602, 604, 606, 608 of FIG. 6 into the vectors 702, 704, 706, 708 of FIG. 7.

In some examples, the text encoder 230 implements example means for encoding text portions into respective vectors. For example, the means for encoding may be implemented by executable instructions such as that implemented by at least blocks 1106 and 1110 of FIG. 11 and/or block 1206 of FIG. 12. In some examples, the executable instructions of blocks 1106 and 1110 of FIG. 11 and/or block 1206 of FIG. 12 may be executed on at least one processor such as the example processor 1412 and/or the example hardware accelerator(s) 1440 of FIG. 14. In other examples, the means for encoding is implemented by hardware logic, hardware implemented state machines, logic circuitry, and/or any other combination of hardware, software, and/or firmware. For example, the means for encoding may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the context search model 200 includes the text organizer 240 to organize text, or portions thereof. For example, in response to the text organizer 240 executing natural language tasks, such as text classification, semantic similarity, clustering, etc., and/or a combination thereof, on vectors, such as the vectors 702, 704, 706, 708 of FIG. 7, the text organizer 240 can organize the text associated with the vectors 702, 704, 706, 708 based on the natural language similarity associated with the text based on the vectors 702, 704, 706, 708.

In some examples, the text organizer 240 calculates and/or otherwise determines a natural language similarity, such as the cosine similarity, between text portions. For example, the text organizer 240 can determine a natural language similarity between the first sentence 602 with respect to one(s) of the second sentence 604, the third sentence 606, and/or the fourth sentence 608 of FIG. 6. In some such examples, the text organizer 240 can calculate the cosine similarity (e.g., a first value of the cosine similarity, a first measure of the cosine similarity, etc.) of the first vector 702 and the second vector 704 based on a ratio of (i) the dot product of the first vector 702 and the second vector 704 and (ii) the product of the length of the first vector 702 and the second vector 704. An example implementation of the cosine similarity between two vectors is illustrated below in the example of Equation (1):

$$\cos(\theta) = \frac{A \cdot B}{\|A\| \cdot \|B\|}, \qquad \text{Equation (1)}$$

In the example of Equation (1) above, the angle between two vectors, such as the first vector 702 and the second vector 704, is cos (θ), which is representative of and/or otherwise indicative of a measure of the similarity between the first sentence 602 and the second sentence 604. In the example of Equation (1) above, vector A may correspond to the first vector 702 and the vector B may correspond to the second vector 704. In the example of Equation (1) above, the dot product (A·B) may be implemented by the example of Equation (2) below:

$$A \cdot B = a_1 \cdot b_1 + a_2 \cdot b_2 + \ldots a_n \cdot b_n, \qquad \text{Equation (2)}$$

In the example of Equation (1) above, the length of the vector A may be implemented by the example of Equation (3) below:

$$\|A\| = \sqrt{a_1^2 + a_2^2 + \ldots a_n^2}, \qquad \text{Equation (3)}$$

In the illustrated example of Equation (3) above, $a_i$ may be representative of the number of times that word i occurs in the first sentence 602. The illustrated example of Equation (3) above may also be used to implement the length of the vector B (e.g., ∥B∥). Additionally or alternatively, the text organizer 240 may determine a similarity measure (e.g., a measure of similarity between two or more sentences, two or more paragraphs, two or more portions of content, two or more documents, etc.), such as a Euclidean distance, a Manhattan Distance, a Jaccard Similarity, or a Minkowski Distance, between one(s) of the vectors 702, 704, 706, 708. In some examples, the text organizer 240 executes semantic similarity tasks on the vectors 702, 704, 706, 708. Semantic similarity can refer to and/or otherwise be representative of a measure of the degree to which two portions of text carry the same meaning. In some examples, the semantic similarity of two portions of text can be used to identify and breakdown content (e.g., a paragraph, an article, etc.) by identifying the contextual switch between the text portions.

In some examples, in response to executing the natural language tasks, the text organizer 240 can identify, determine, etc., that the cosine similarity between the second sentence 604 and the third sentence 606 of FIG. 6 satisfies a threshold (e.g., a similarity threshold, a cosine similarity threshold, a semantic similarity threshold, etc.). For example, the text organizer 240 can compare the second vector 704 and the third vector 706 and determine that the cosine similarity satisfies the threshold based on the comparison. In some such examples, the text organizer 240 can re-organize and/or otherwise re-compile the text 600 of FIG. 6 by combining the second sentence 604 and the third sentence 606 into a second example text portion 804 or section (e.g., text section) of FIG. 8 because the second sentence 604 and the third sentence 606 carry the same or relatively similar contextual meaning.

In some examples, the text organizer 240 implements example means for organizing text portions based on natural language similarity of the text portions, and the natural language similarity based one or more vectors associated with one(s) of the text portions. For example, the means for organizing may be implemented by executable instructions such as that implemented by at least block 1108 of FIG. 11. In some examples, the executable instructions of block 1108 of FIG. 11 may be executed on at least one processor such as the example processor 1412 and/or the example hardware accelerator(s) 1440 of FIG. 14. In other examples, the means for organizing is implemented by hardware logic, hardware implemented state machines, logic circuitry, and/or any other combination of hardware, software, and/or firmware. For example, the means for organizing may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples in which text portions include a first sentence having a first vector of the respective vectors and a second sentence having a second vector of the respective vectors, and in which the natural language similarity is a cosine similarity, the means for organizing is to determine a value of the cosine similarity based on a comparison of the first vector and the second vector, and in response to the value satisfying a threshold, associate the first sentence and the second sentence. In some examples in which one or more portions of a plurality of content is encoded, the means for organizing is to organize the one or more portions based on the natural language similarity of the one or more portions.

Further depicted in the example of FIG. 8 is example re-organized text 800, which is based on the text 600 of FIG. 6. The re-organized text 800 of FIG. 8 includes a first example text portion 802, the second example text portion 804, and a third example text portion 806. In the example of FIG. 8, the first text portion 802 corresponds to the first sentence 602 of FIG. 6. The second text portion 804 of FIG. 8 corresponds to the second sentence 604 and the third sentence 606 of FIG. 6. The third text portion 806 of FIG. 8 corresponds to the fourth sentence 608 of FIG. 6.

Turning back to the illustrated example of FIG. 2, the context search model 200 includes the search result generator 250 to generate and/or otherwise output search result(s) in response to a query. In some examples, the search result generator 250 can implement one or more AI/ML models. In some such examples, the search result generator 250 can include, correspond to, and/or otherwise be representative of one or more neural networks (e.g., one or more artificial neural networks, one or more recurrent neural networks, etc., and/or a combination thereof). For example, the search result generator 250 can compare a first vector associated with a search query to the dense vectors 284 based on AI/ML techniques, processes, etc., as described herein.

In some examples, the search result generator 250 implements example means for generating one or more search results based on organized text portions. For example, the means for generating may be implemented by executable instructions such as that implemented by at least blocks 1110 and 1114 of FIG. 11 and/or blocks 1208, 1210, and 1216 of FIG. 12. In some examples, the executable instructions of blocks 1110 and 1114 of FIG. 11 and/or blocks 1208, 1210, and 1216 of FIG. 12 may be executed on at least one processor such as the example processor 1412 and/or the example hardware accelerator(s) 1440 of FIG. 14. In other examples, the means for generating is implemented by hardware logic, hardware implemented state machines, logic circuitry, and/or any other combination of hardware, software, and/or firmware. For example, the means for generating may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples in which content is first content, the means for generating is to execute a machine-learning model with organized text portions as inputs, which the machine-learning model is to generate one or more search results. In some such examples, the means for generating is to associate metadata with the one or more portions, and store an association of the metadata and a first one of the one or more portions in a database, the one or more search results based on the association.

In the illustrated example of FIG. 2, the context search model 200 includes the search result ranker 260 to rank the search result(s) generated by the search result generator 250. In some examples, the search result ranker 260 can implement one or more AI/ML models. In some such examples, the search result ranker 260 can include, correspond to, and/or otherwise be representative of, one or more neural networks (e.g., one or more artificial neural networks, one or more recurrent neural networks, etc., and/or a combination thereof). For example, the search result ranker 260 can rank one or more search results based on AI/ML techniques, processes, etc., as described herein.

In some examples, the search result ranker 260 implements example means for ranking one or more search results for presentation on a computing device. For example, the means for ranking may be implemented by executable instructions such as that implemented by at least blocks 1212 and 1216 of FIG. 12. In some examples, the executable instructions of blocks 1212 and 1216 of FIG. 12 may be executed on at least one processor such as the example processor 1412 and/or the example hardware accelerator(s) 1440 of FIG. 14. In other examples, the means for ranking is implemented by hardware logic, hardware implemented state machines, logic circuitry, and/or any other combination of hardware, software, and/or firmware. For example, the means for ranking may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples in which a machine-learning model is a first machine-learning model and training data is first training data, the means for ranking is to execute a second machine-learning model with one or more search results as one or more inputs, which the second machine-learning model is to generate the one or more ranked search results.

In the illustrated example of FIG. 2, the context search controller 102 includes the context search model trainer 270 to generate, train, and/or re-train AI/ML models based on the training data 282. For example, the context search model trainer 270 can train the search result generator 250, the search result ranker 260, etc., via supervised and/or non-supervised training based on the training data 282 (e.g., based on using the training data 282 as inputs, training inputs, etc.). In some examples, the context search model trainer 270 asynchronously trains the AI/ML models. In some examples, the context search model trainer 270 synchronously or periodically trains the AI/ML models. For example, the context search model trainer 270 can train the AI/ML models associated with the context search model 200 in response to a quantity of the training data 282 satisfying a pre-determined threshold.

In some examples, the context search model trainer 270 can implement supervised training by using inputs and corresponding expected (e.g., labeled) outputs to select parameters (e.g., by iterating over combinations of select parameters) for the AI/ML models that reduce model error. In some examples, the context search model trainer 270 implements unsupervised training (e.g., used in deep learning, a subset of machine learning, etc.) by involving inferring patterns from inputs to select parameters for the AI/ML models (e.g., without the benefit of expected (e.g., labeled) outputs).

In some examples, the context search model trainer 270 can train the AI/ML models until a pre-determined quantity of the training data 282 has been processed. Alternatively, the context search model trainer 270 can train the AI/ML models until test queries return test results that satisfy pre-determined criteria, a pre-defined threshold of accuracy, etc., and/or a combination thereof. In some examples, the context search model trainer 270 can train the AI/ML models remotely using one or more computing devices (e.g., computer servers) at one or more remote central facilities (e.g., the central facility 112 of FIG. 1). Alternatively, the context search model trainer 270 may offload the training of the AI/ML models to client devices, such as edge devices, Internet-enabled smartphones, Internet-enabled tablets, etc., such as the one(s) of the computing devices 104, 106, 108 of FIG. 1.

In some examples, the context search model trainer 270 performs the training of the AI/ML models using hyperparameters that control how the learning is performed (e.g., a learning rate, a number of layers to be used in the machine learning model, etc.). In some examples, the context search model trainer 270 utilize hyperparameters that control tokenization (e.g., sentence tokenization), generation of embedded vectors, text classification, semantic similarity, clustering, etc., to implement the training of the AI/ML models. In some examples, the context search model trainer 270 can select such hyperparameters based on manual selection from a user, automated selection, etc. In some examples, the context search model trainer 270 may perform re-training of the AI/ML models. Such re-training may be performed in response to a quantity of the training data 282 exceeding and/or otherwise satisfying a threshold. In some examples, the context search model trainer 270 only trains the AI/ML models once prior to deployment.

In some examples, the context search model trainer 270 trains the AI/ML models, such as the search result generator 250, the search result ranker 260, and/or, more generally, the context search model 200, using the training data 282. In some examples, the training data 282 may originate from publicly available data, locally generated data, etc., and/or a combination thereof. For example, the training data 282 may originate from the first content database(s) 114 of FIG. 1. In some examples, the context search model trainer 270 labels the training data 282 when supervised training is used. In some examples, the context search model trainer 270 can apply and/or otherwise associate label(s) to the training data 282 via content generators, application developers, end users, etc., and/or via automated processes.

In some examples, in response to completing the training of the AI/ML models, the one or more AI/ML models is/are deployed for use as one or more executable constructs that process an input and provides an output based on the network of nodes and connections defined in the model. In some examples, the context search model trainer 270 stores the AI/ML models in the storage 280. In some examples, the context search model trainer 270 compiles the AI/ML models as one(s) of the search result generator 250, the search result ranker 260, and/or, more generally, the context search model 200. For example, the context search model trainer 270 can generate, compile, and/or otherwise output the context search model 200 or portion(s) thereof in response to training the one or more AI/ML models. In some such examples, the one or more AI/ML models may then be executed by the context search controller 102, the central facility 112, etc., to identify and/or otherwise output search results, ranked search results, etc., based on one or more queries for content.

Once trained, the search result generator 250, the search result ranker 260, and/or, more generally, the context search model 200, may operate in an inference phase to process data. For example, in the inference phase, data to be analyzed (e.g., live data) is input to the context search model 200, and the context search model 200 executes to create one or more outputs. In some such examples, the context search model 200 generates the output(s) based on what it learned from the training (e.g., by executing the context search model 200 to apply the learned patterns and/or associations to the live data). In some examples, the query handler 210, and/or, more generally, the context search model 200, pre-processes the input data (e.g., the query) before being used as an input to the AI/ML models. In some examples, the search result generator 250, the search result ranker 260, and/or, more generally, the context search model 200, may post-process the output data after the output data is generated by the AI/ML models to transform the output data into a useful result (e.g., a display of unranked or ranked search results).

In some examples, the context search model trainer 270 captures and/or otherwise obtains outputs of the context search model 200 as feedback. By analyzing the feedback, the context search model trainer 270 can determine an accuracy of the context search model 200. If the context search model trainer 270 determines that the feedback indicates that the accuracy of the context search model 200 is less than a threshold or other criterion, the context search model trainer 270 may trigger or initialize training of an updated context search model 200 or portion(s) thereof using the feedback and an updated training data set, hyperparameters, etc., to generate an updated, deployed version of the context search model 200 or portion(s) thereof.

In some examples in which content is first content, the context search model trainer 270 implements example means for training a machine-learning model based on training data including second content. For example, the means for training may be implemented by executable instructions such as that implemented by at least blocks 1302, 1304, 1306, 1308, 1310, and 1312 of FIG. 13. In some examples, the executable instructions of blocks 1302, 1304, 1306, 1308, 1310, and 1312 of FIG. 13 may be executed on at least one processor such as the example processor 1412 and/or the example hardware accelerator(s) 1440 of FIG. 14. In other examples, the means for training is implemented by hardware logic, hardware implemented state machines, logic circuitry, and/or any other combination of hardware, software, and/or firmware. For example, the means for training may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples in which the machine-learning model is a first machine-learning model, the training data is first training data, the means for training is to train a second machine-learning model based on second training data including at least one of the second content or third content.

In the illustrated example of FIG. 2, the context search controller 102 includes the storage 280 to record data (e.g., the training data 282, the dense vectors 284, etc.). In some examples, the storage 280 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The storage 280 may additionally or alternatively be implemented by one or more double data rate (DDR) memories, such as DDR, DDR2, DDR3, DDR4, mobile DDR (mDDR), etc. The storage 280 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the storage 280 is illustrated as a single storage, storage device, etc., the storage 280 can be implemented by any number and/or type(s) of storages, storage devices, storage disks, etc. Furthermore, the data stored in the storage 280 may be in any data format such as, for example, binary data, comma delimited data, tab delimited data, structured query language (SQL) structures, NoSQL structures, etc.

In some examples, the storage 280 implements an elastic database or storage construct. For example, the storage 280 can be implemented as a NoSQL database that can store, retrieve, and manage document-oriented and semi-structured data. In some such examples, the storage 280 can use documents rather than schema or tables to facilitate data storage or database operations (e.g., query operations, information retrieval, etc.).

In some examples, the training data 282 can be data from the first content database(s) 114 of FIG. 1, telemetry data obtained from the computing devices 104, 106, 108, of FIG. 1, metrics or statistics such as popularity indexes of content, metadata associated with content (e.g., a title of an article, a uniform resource locator (URL) of an article, text of an article, an article identifier (ID), etc.), etc., and/or a combination thereof. In some examples, the training data 282 is labeled while, in other examples, the training data 282 may not be labeled. In some examples, the dense vectors 284 of the example of FIG. 2 can be vectors associated with indexed content. For example, the dense vectors 284 can implement a first vector based on the first text portion 802 of FIG. 8, a second vector based on the second text portion 804 of FIG. 8, a third vector based on the third text portion 806 of FIG. 8, etc.

While an example manner of implementing the context search controller 102 of FIG. 1 is illustrated in FIG. 2, one or more of the elements, processes and/or devices illustrated in FIG. 2 may be combined, divided, re-arranged, omitted, eliminated and/or implemented in any other way. Further, the example query handler 210, the example text tokenizer 220, the example text encoder 230, the example text organizer 240, the example search result generator 250, the example search result ranker 260, and/or, more generally, the example context search model 200, the example context search model trainer 270, the example storage 280, the example training data 282, the example dense vectors 284, and/or, more generally, the example context search controller 102 of FIG. 1 may be implemented by hardware, software, firmware and/or any combination of hardware, software and/or firmware. Thus, for example, any of the example query handler 210, the example text tokenizer 220, the example text encoder 230, the example text organizer 240, the example search result generator 250, the example search result ranker 260, and/or, more generally, the example context search model 200, the example context search model trainer 270, the example storage 280, the example training data 282, the example dense vectors 284, and/or, more generally, the example context search controller 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) (e.g., field programmable gate array(s) FPGA(s)). When reading any of the apparatus or system claims of this patent to cover a purely software and/or firmware implementation, at least one of the example query handler 210, the example text tokenizer 220, the example text encoder 230, the example text organizer 240, the example search result generator 250, the example search result ranker 260, and/or, more generally, the example context search model 200, the example context search model trainer 270, the example storage 280, the example training data 282, and/or the example dense vectors 284 is/are hereby expressly defined to include a non-transitory computer readable storage device or storage disk such as a memory, a DVD, a CD, a Blu-ray disk, etc., including the software and/or firmware. Further still, the example context search controller 102 of FIG. 1 may include one or more elements, processes and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
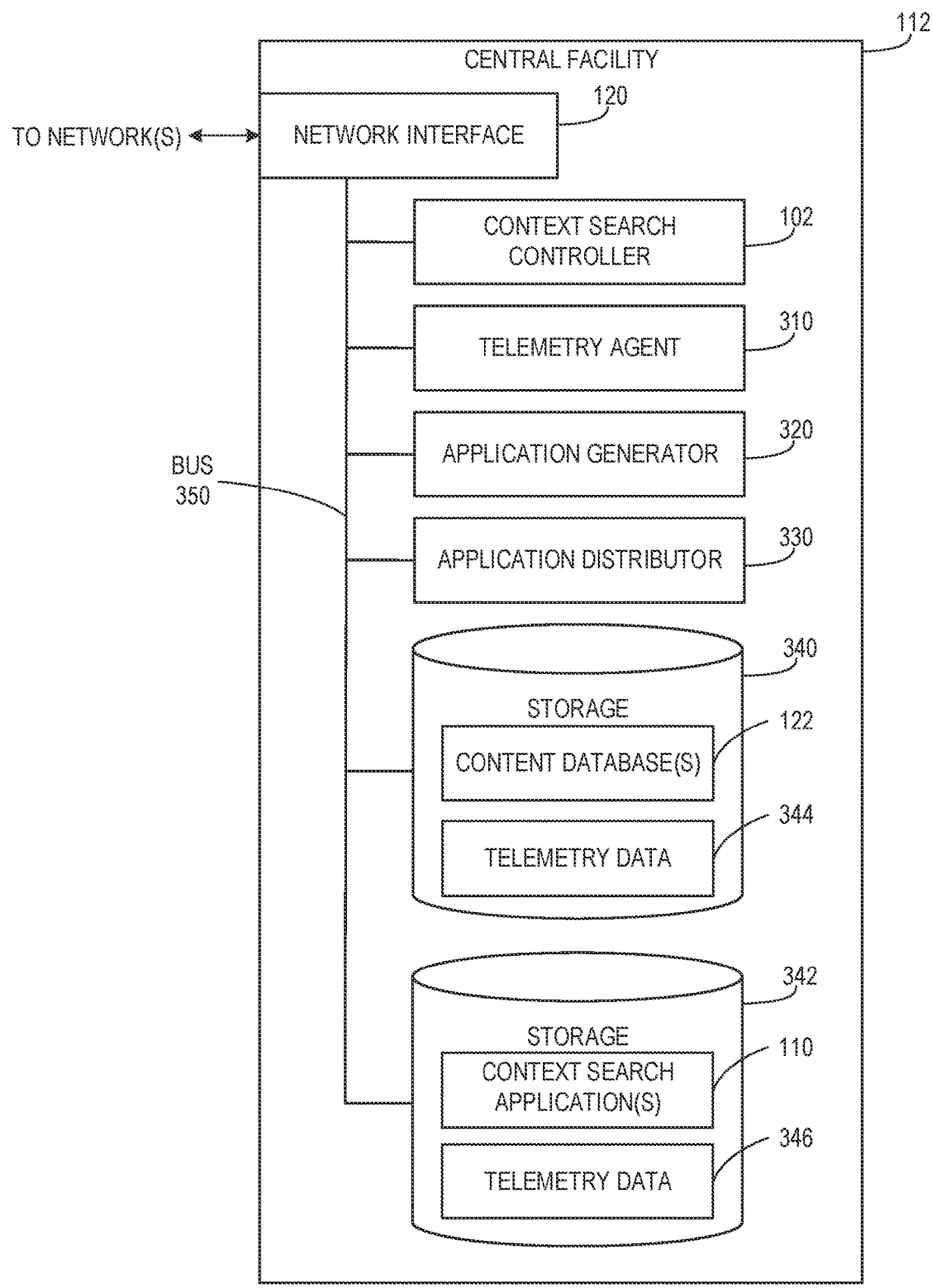
FIG. 3 is an example implementation of the central facility of FIG. 1.

FIG. 3 is an example implementation of the central facility 112 of FIG. 1. The central facility 112 is representative of an environment (e.g., a computing environment) that can include one or more servers (e.g., physical computer servers, cloud-based computer servers, virtualized computer servers, etc., and/or a combination thereof) to facilitate the execution of query requests from the computing devices 104, 106, 108 of FIG. 1, generate application(s), such as the context search application 110 of FIG. 1, and/or distribute the application(s) to one(s) of the computing device(s) 104, 106, 108. In the example of FIG. 3, the central facility 112 includes the network interface 120 of FIG. 1, the context search controller 102 of FIGS. 1 and/or 2, an example telemetry agent 310, an example application generator 320, an example application distributor 330, a first example storage 340, and a second example storage 342. In this example, the first storage 340 includes the second content database(s) 122 of FIG. 1 and first example telemetry data 344. In this example, the second storage 342 includes the context search application(s) 110 of FIG. 1 and second example telemetry data 346.

In the illustrated example of FIG. 3, the network interface 120, the context search controller 102, the telemetry agent 310, the application generator 320, the application distributor 330, the first storage 340, and the second storage 342 are in communication with one(s) of each other via a third example bus 350. For example, the third bus 350 can be implemented by at least one of an I2C bus, a SPI bus, or a PCI bus. Additionally or alternatively, the third bus 350 may be implemented by any other type of computing, communication, and/or electrical bus. In some examples, the third bus 350 is a virtualized bus.

The central facility 112 of the example of FIG. 3 includes the network interface 120 to obtain information from and/or transmit information to the first network 116 and/or the second network 118 of FIG. 1. In some examples, the network interface 120 implements a web server that receives queries and data (e.g., the first telemetry data 344, the second telemetry data 346, etc.) from the computing devices 104, 106, 108 of FIG. 1, data (e.g., searchable content) from the first content database(s) 114 of FIG. 1, etc. In some examples, the network interface 120 implements a web server that transmits data, such as the context search application(s) 110 to one(s) of the computing device(s) 104, 106, 108. In the illustrated example, the information to/from the first network 116 and/or the second network 118 is formatted as HTTP message(s). However, any other message format and/or protocol may additionally or alternatively be used such as, for example, a file transfer protocol (FTP), a simple message transfer protocol (SMTP), an HTTP secure (HTTPS) protocol, etc.

In the illustrated example of FIG. 3, the central facility 112 includes the context search controller 102 to facilitate the execution of query requests based on executing one or more AI/ML based models, which may be implemented by the context search model 200 of FIG. 2. For example, the central facility 112 may effectuate functions, tasks, etc., in connection with the context search controller 102 of FIGS. 1 and/or 2.

In the illustrated example of FIG. 3, the central facility 112 includes the telemetry agent 310 to determine telemetry parameters by compiling and/or otherwise aggregating information included in the first telemetry data 344, the second telemetry data 346, etc. In some examples, the telemetry agent 310 calculates and/or otherwise determines telemetry parameters based on telemetry data from computing devices such as, the computing devices 104, 106, 108 of FIG. 1. For example, the telemetry agent 310 can determine a telemetry parameter indicative of information associated with queries, frequency statistics, popularity indices, etc., associated with content from the second content database(s) 122 that is/are requested by the computing devices 104, 106, 108. In some such examples, the first telemetry data 344 can be associated with and/or otherwise correspond to the second content database(s) 122. In some examples, the first telemetry data 344 includes metadata (e.g., a title of an article, a URL of an article, text of an article, an article ID, etc.) associated with data in the first content database(s) 122.

In some examples, the telemetry agent 310 determines a telemetry parameter indicative of a quantity of computing devices that are executing the context search application(s) 110. In some examples, the telemetry agent 310 determines a telemetry parameter indicative of information associated with queries, frequency statistics, popularity indices, etc., associated with requested content, the queries, etc. In some such examples, the second telemetry data 346 can be associated with and/or otherwise correspond to operation of the context search application(s) 110 by one(s) of the computing device(s) 104, 106, 108 of FIG. 1. In some examples, the second telemetry data 346 includes metadata (e.g., a title of an article, a URL of an article, text of an article, an article ID, etc.) associated with queries obtained from one(s) of the computing device(s) 104, 106, 108. In some examples, the telemetry agent 310 can store telemetry data obtained from the computing devices 104, 106, 108 as one(s) of the first telemetry data 344 in the first storage 340 and/or the second telemetry data 346 in the second storage 344.

In the illustrated example of FIG. 3, the central facility 112 includes the application generator 320 to assemble, compile, and/or otherwise generate the context search application(s) 110. In some examples, the application generator 320 generates updates to the context search application(s) 110. For example, the application generator 320 can generate a new or updated version of the context search application(s) 110. The application generator 320 can store the context search application(s) 110, the new or updated version(s), etc., in the second storage 342 as the context search application(s) 110.

In some examples, the application generator 320 implements example means for compiling an application including a user interface to obtain a query and a telemetry agent to generate telemetry data based on the query. For example, the means for compiling may be implemented by executable instructions such as that implemented by at least block 1312 of FIG. 13. In some examples, the executable instructions of block 1312 of FIG. 13 may be executed on at least one processor such as the example processor 1412 and/or the example hardware accelerator(s) 1440 of FIG. 14. In other examples, the means for compiling is implemented by hardware logic, hardware implemented state machines, logic circuitry, and/or any other combination of hardware, software, and/or firmware. For example, the means for compiling may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 3, the central facility 112 includes the application distributor 330 to select and transmit one(s) of the context search application(s) 110. For example, in response to a request from one of the computing devices 104, 106, 108, the application distributor 330 can transmit the context search application(s) 110 to the requesting one of the computing devices 104, 106, 108.

In some examples, the application distributor 330 implements a content delivery network (CDN) associated with the central facility 112. For example, the application distributor 330 can control, deploy, and/or otherwise manage a geographically distributed network of proxy servers and corresponding data centers (e.g., a data center including one or more computer servers) to deliver software, such as the context search application(s) 110 to one(s) of the computing devices 104, 106, 108 based on a geographic location of requesting one(s) of the computing devices 104, 106, 108, an origin of respective requests for the software, etc.

In some examples, the application distributor 330 implements example means for distributing an application to a computing device (e.g., a via a network). For example, the means for distributing may be implemented by executable instructions such as that implemented by at least block 1312 of FIG. 13. In some examples, the executable instructions of block 1312 of FIG. 13 may be executed on at least one processor such as the example processor 1412 and/or the example hardware accelerator(s) 1440 of FIG. 14. In other examples, the means for distributing is implemented by hardware logic, hardware implemented state machines, logic circuitry, and/or any other combination of hardware, software, and/or firmware. For example, the means for distributing may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, a NIC, an interface circuit, etc.) structured to perform the corresponding operation without executing software or firmware, but other structures are likewise appropriate.

In the illustrated example of FIG. 3, the central facility 112 includes the first storage 340 and the second storage 342 to record data (e.g., the second content database(s) 122, the first telemetry data 344, the context search application(s) 110, the second telemetry data 346, etc.). The first storage 340 and/or the second storage 342 can be implemented by a volatile memory (e.g., an SDRAM, DRAM, RDRAM, etc.) and/or a non-volatile memory (e.g., flash memory). The first storage 340 and/or the second storage 342 may additionally or alternatively be implemented by one or more DDR memories, such as DDR, DDR2, DDR3, DDR4, mDDR, etc. The first storage 340 and/or the second storage 342 may additionally or alternatively be implemented by one or more mass storage devices such as HDD(s), CD drive(s), DVD drive(s), SSD drive(s), etc. While in the illustrated example the first storage 340 and/or the second storage 342 is/are illustrated as single storages, storage devices, etc., the first storage 340 and/or the second storage 342 can be implemented by any number and/or type(s) of databases. Furthermore, the data stored in the first storage 340 and/or the second storage 342 may be in any data format such as, for example, binary data, comma delimited data, tab delimited data, SQL structures, NoSQL structures, etc.

In some examples, the first storage 340 and/or the second storage 342 is/are implemented by one or more elastic databases. For example, the first storage 340 and/or the second storage 342 can be NoSQL database(s) that can store, retrieve, and manage document-oriented and semi-structured data. In some such examples, the first storage 340 and/or the second storage 342 can use documents rather than schema or tables to facilitate database operations (e.g., query operations, information retrieval, etc.).

While an example manner of implementing the central facility 112 of FIG. 1 is illustrated in FIG. 3, one or more of the elements, processes and/or devices illustrated in FIG. 3 may be combined, divided, re-arranged, omitted, eliminated and/or implemented in any other way. Further, the example network interface 120, the example context search controller 102, the example telemetry agent 310, the example application generator 320, the example application distributor 330, the first example storage 340, the second example content database(s) 122, the first example telemetry data 344, the second example storage 342, the example context search application(s) 110, the second example telemetry data 346 and/or, more generally, the example central facility 112 of FIG. 1 may be implemented by hardware, software, firmware and/or any combination of hardware, software and/or firmware. Thus, for example, any of the example network interface 120, the example context search controller 102, the example telemetry agent 310, the example application generator 320, the example application distributor 330, the first example storage 340, the second example content database(s) 122, the first example telemetry data 344, the second example storage 342, the example context search application(s) 110, the second example telemetry data 346 and/or, more generally, the example central facility 112 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example network interface 120, the example context search controller 102, the example telemetry agent 310, the example application generator 320, the example application distributor 330, the first example storage 340, the second example content database(s) 122, the first example telemetry data 344, the second example storage 342, the example context search application(s) 110, and/or the second example telemetry data 346 is/are hereby expressly defined to include a non-transitory computer readable storage device or storage disk such as a memory, a DVD, a CD, a Blu-ray disk, etc., including the software and/or firmware. Further still, the example central facility 112 of FIG. 1 may include one or more elements, processes and/or devices in addition to, or instead of, those illustrated in FIG. 3, and/or may include more than one of any or all of the illustrated elements, processes, and devices.

Figure 4:
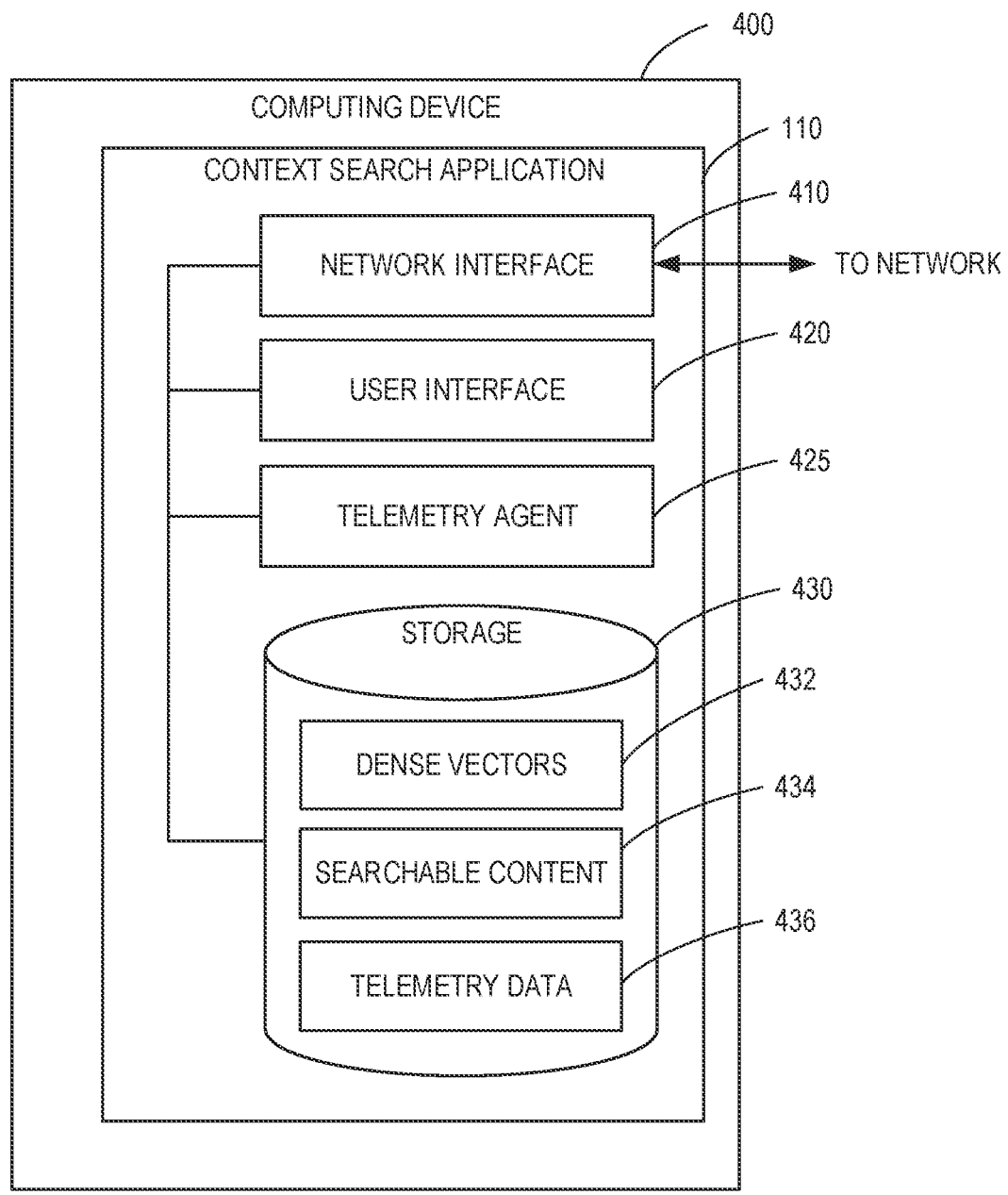
FIG. 4 is an example implementation of the context search application of FIG.

FIG. 4 is an example implementation of the context search application 110 of FIGS. 1 and/or 3 executed by an example computing device 400. For example, the computing device 400 can implement one(s) of the computing device(s) 104, 106, 108 of FIG. 1. In some such examples, an operating system (OS) or other firmware and/or software layer(s) of one of the computing devices 104, 106, 108 can execute the context search application 110 by executing, with hardware (e.g., at least one processor, ASIC(s), FPGA(s), etc., and/or a combination thereof), corresponding machine readable instructions. The context search application 110 depicted in FIG. 4 includes an example network interface 410, an example user interface 420, an example telemetry agent 425, and example storage 430. In FIG. 4, the storage 430 includes example dense vectors 432, example searchable content 434, and third example telemetry data 436.

In the illustrated example of FIG. 4, the context search application 110 includes the network interface 410 to obtain information from and/or transmit information to the first network 116 of FIG. 1. In some examples, the network interface 410 can implement a web server that receives data (e.g., the dense vectors 432, the searchable content 434, an updated version of the context search application 110, etc.) from the central facility 112 of FIGS. 1 and/or 3. In some examples, the network interface 410 can implement a web server that transmits data, such as a query, the third telemetry data 436, etc., to the central facility 112. In some examples, the information to/from the first network 116 can be formatted as HTTP message(s). However, any other message format and/or protocol may additionally or alternatively be used such as, for example, FTP, SMTP, HTTPS, etc.

In the illustrated example of FIG. 4, the context search application 110 includes the user interface 420 to display information on an output device (e.g., a display) of the computing device 400. For example, the user interface 420 can be launched to obtain a query from a user, display search result(s), etc.

In the illustrated example of FIG. 4, the context search application 110 includes the telemetry agent 425 to determine telemetry parameters based on query requests generated by the context search application 110. For example, the telemetry agent 425 can generate the third telemetry data 436 and transmit the third telemetry data 436 to the central facility 112 via the network interface 410. For example, the third telemetry data 436 can include query-associated data (e.g., an endpoint URL, one or more query keywords, etc.), frequency statistics (e.g., a frequency of a query being submitted), metadata (e.g., metadata associated with a query, metadata associated with retrieved content, etc.), etc. In some examples, the third telemetry data 436 includes information associated with the context search application 110 (e.g., a version of the context search application 110, a quantity of hardware resources consumed by the context search application 110, etc.), the computing device 400 (e.g., a type and/or version of OS operated by the computing device 400, a web browser type and/or version, etc.), etc.

In the illustrated example of FIG. 4, the context search application 110 includes the storage 430 to record data (e.g., the dense vectors 432, the searchable content 434, the third telemetry data 436, etc.). In some examples, the dense vectors 432 can implement the dense vectors 284 of FIG. 2, dense vectors based on one(s) of the vectors 702, 704, 706, 708 of FIG. 7, etc. In some examples, the searchable content 434 (e.g., the searchable content 342 of FIG. 3) can include articles (e.g., information or text-based articles), books, magazines, etc., or any other text-based medium. For example, the searchable content 434 can be cached unranked and/or ranked search results, data or information associated with the unranked and/or ranked search results, etc. Advantageously, the searchable content 434 can facilitate execution of previously generated queries with increased speed by providing the unranked and/or ranked search results from the searchable content 434 rather than from the central facility 112 of FIGS. 1 and/or 3.

The storage 430 can be implemented by a volatile memory (e.g., an SDRAM, DRAM, RDRAM, etc.) and/or a non-volatile memory (e.g., flash memory). The storage 430 may additionally or alternatively be implemented by one or more DDR memories, such as DDR, DDR2, DDR3, DDR4, mDDR, etc. The storage 430 may additionally or alternatively be implemented by one or more mass storage devices such as HDD(s), CD drive(s), DVD drive(s), SSD drive(s), etc. While in the illustrated example the storage 430 is illustrated as a single storage, storage device, etc., the storage 430 can be implemented by any number and/or type(s) of storage. Furthermore, the data stored in the storage 430 may be in any data format such as, for example, binary data, comma delimited data, tab delimited data, SQL structures, NoSQL structures, etc.

In some examples, the storage 430 can be implemented by an elastic database. For example, the storage 430 can be a NoSQL database that can store, retrieve, and manage document-oriented and semi-structured data. In some such examples, the storage 430 can use documents rather than schema or tables to facilitate database operations (e.g., query operations, information retrieval, etc.).

While an example manner of implementing the context search application 110 of FIGS. 1 and/or 3 is illustrated in FIG. 4, one or more of the elements, processes and/or devices illustrated in FIG. 4 may be combined, divided, re-arranged, omitted, eliminated and/or implemented in any other way. Further, the example network interface 410, the example user interface 420, the example telemetry agent 425, the example storage 430, the example dense vectors 432, the example searchable content 434, the third example telemetry agent 436 and/or, more generally, the example context search application 110 of FIGS. 1 and/or 3 may be implemented by hardware, software, firmware and/or any combination of hardware, software and/or firmware. Thus, for example, any of the example network interface 410, the example user interface 420, the example telemetry agent 425, the example storage 430, the example dense vectors 432, the example searchable content 434, the third example telemetry data 436 and/or, more generally, the example context search application 110 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example network interface 410, the example user interface 420, the example telemetry agent 425, the example storage 430, the example dense vectors 432, the example searchable content 434, and/or the third example telemetry data 436 is/are hereby expressly defined to include a non-transitory computer readable storage device or storage disk such as a memory, a DVD, a CD, a Blu-ray disk, etc., including the software and/or firmware. Further still, the example context search application 110 of FIGS. 1 and/or 3 may include one or more elements, processes, and/or devices in addition to, or instead of, those illustrated in FIG. 4, and/or may include more than one of any or all of the illustrated elements, processes, and devices.

Figure 5:
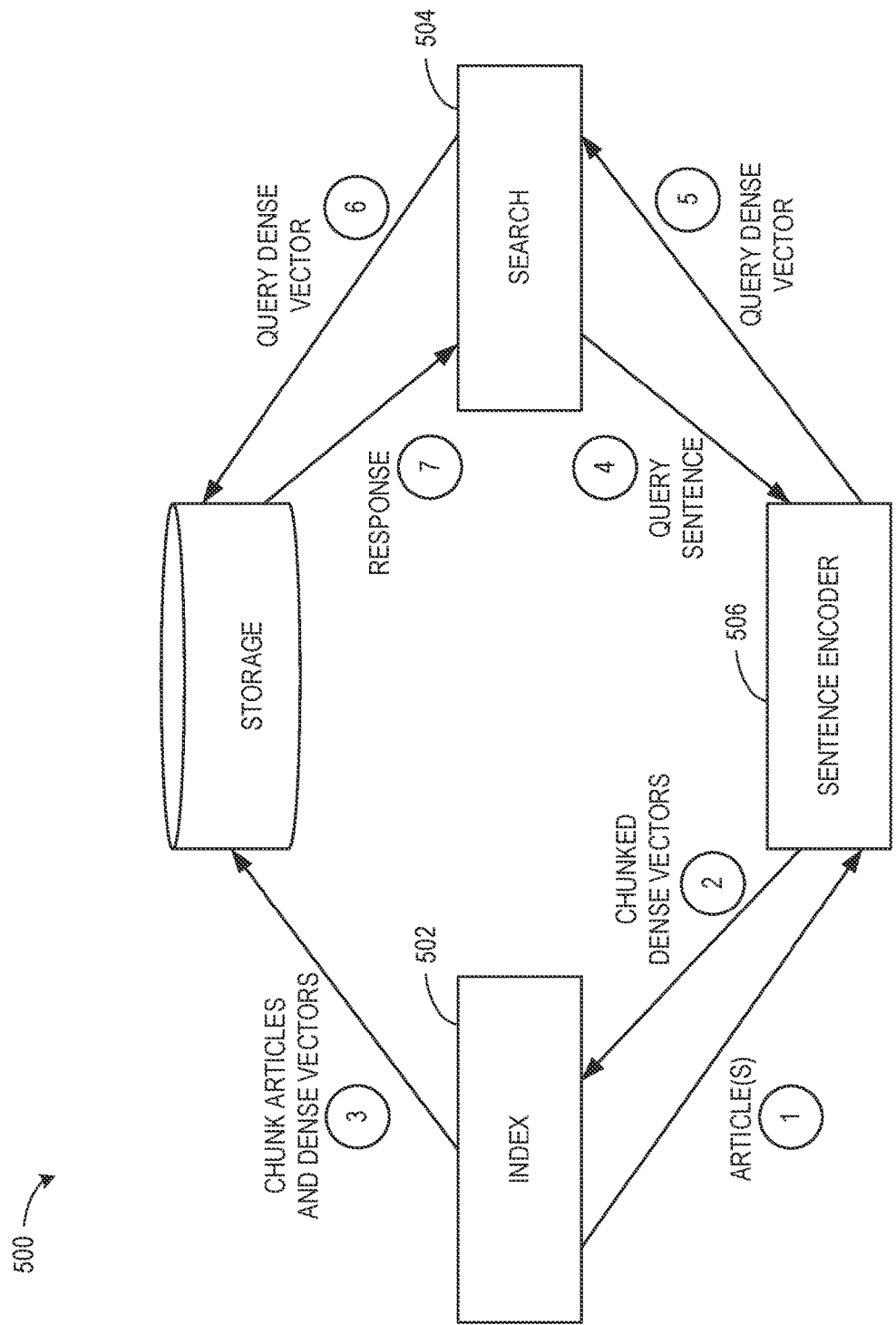
FIG. 5 is an illustration of an example context search indexing and retrieval workflow.

FIG. 5 is an illustration of an example context search indexing and retrieval workflow 500 that can be executed by the context search controller 102 of FIGS. 1, 2, and/or 3. The context search indexing and retrieval workflow 500 includes an indexing operation 502 (represented by the "INDEX" box) and a search or retrieval operation 504 (represented by the "SEARCH" box). For example, the context search controller 102 can implement the indexing operation 502 by executing operations (1)-(3) of the workflow 500. In some such examples, the context search controller 102 can implement the retrieval operation 504 by executing operations (4)-(8) of the workflow 500.

In the illustrated example of FIG. 5, the indexing operation 502 includes translating the entire search corpus into a database of contextual sentence chunks for subsequent retrieval. During a first example operation (1), the context search controller 102 can decompose each article or document (e.g., a portion of the first content database(s) 114 of FIG. 1, the second content database(s) 122 of FIGS. 1 and/or 3, the text 600 of FIG. 6, etc.) in the corpus into an array of its sentences (e.g., the sentences 602, 604, 606, 608 of FIG. 6). During a second example operation (2), an example sentence encoder 506 of the context search controller 102 can convert and/or otherwise translate each sentence of the article into a high-dimensional vector (e.g., one(s) of the vectors 702, 704, 706, 708 of FIG. 7) that represents a corresponding neural context (e.g., a context above and beyond the specific words used in a query, a context with the intuition being that words such as pine and oak might have similar vector representations despite sharing no letters between them). For example, the sentence encoder 506 can be implemented by the text encoder 230 of FIG. 2.

During a third example operation (3), the context search controller 102 can compare each neural context vector against the subsequent neural context vector, proceeding sequentially through the article. For example, the context search controller 102 can combine like vectors using a similarity algorithm into chunks consisting of one, and possibly several, sentences from that article. During the third operation (3), the context search controller 102 can repeat (e.g., iteratively repeat) the aforementioned vector translation approach on each of these chunks and index the resulting outputs (e.g., a pairing of chunks of text and their associated neural context vectors) in storage (e.g., the storage 280 of FIG. 2, the first storage 340 of FIG. 3, the second storage 342 of FIG. 3, etc.).

In the illustrated example of FIG. 5, the retrieval operation 504 includes the context search controller 102 returning entries from the storage that are most relevant to the search query. During a fourth example operation (4), the context search controller 102 can obtain a search query (e.g., the query 902 of FIG. 9). During a fifth example operation (5), the context search controller 102 can translate the search query into a neural context vector, using the same process applied to the sentences and chunks from the corpus documents described above in connection with the second operation (2). During a sixth example operation (6), the context search controller 102 can query the storage using the neural context vector. During a seventh example operation (7), the context search controller 102 can use the similarity algorithm to retrieve results from the storage. The context search controller 102 can rank highest the chunks whose neural context vectors are most similar to the neural context vector corresponding to the search query, while ranking lowest the chunks whose neural context vectors are least similar. In some examples, the context search controller 102 can specify a total number of results to be generated, displayed, etc.

FIG. 6 depicts example text 600 that can be indexed by the context search controller 102 of FIGS. 1, 2, and/or 3. The text 600 includes the first example sentence 602, the second example sentence 604, the third example sentence 606, and the fourth example sentence 608.

FIG. 7 depicts the example vectors 700 that can be generated by the context search controller 102 of FIGS. 1, 2, and/or 3. In some examples, the vectors 700 of FIG. 7 can correspond to the text 600 of FIG. 6. The vectors 700 include the first example vector 702, the second example vector 704, the third example vector 706, and the fourth example vector 708. For example, the text encoder 230 of FIG. 2 can generate the vectors 700 based on the text 600 of FIG. 6.

FIG. 8 depicts the example text 600 of FIG. 6 re-organized by the context search controller 102 of FIGS. 1, 2, and/or 3 into the example re-organized text 800 based on the vectors 700 of FIG. 7. For example, the text organizer 240 of FIG. 2 can generate the re-organized text 800.

FIG. 9 depicts an example query 902, a corresponding example vector 904, and example information retrieval results 906 generated by the context search controller 102 of FIGS. 1, 2, and/or 3. For example, the search result generator 250 of FIG. 2 can generate the information retrieval results 906 in response to the query 902.

FIG. 10 depicts example information retrieval results 1000 generated by the context search controller 102 of FIGS. 1, 2, and/or 3. For example, the information retrieval results 1000 can be based on the information retrieval results 906 of FIG. 9. In some such examples, the information retrieval results 1000 of FIG. 10 can be generated by ranking the information retrieval results 906 of FIG. 9. For example, the search result ranker 260 of FIG. 2 can rank the information retrieval results 906 of FIG. 9 to generate the information retrieval results 1000 of FIG. 10.

Figure 11:
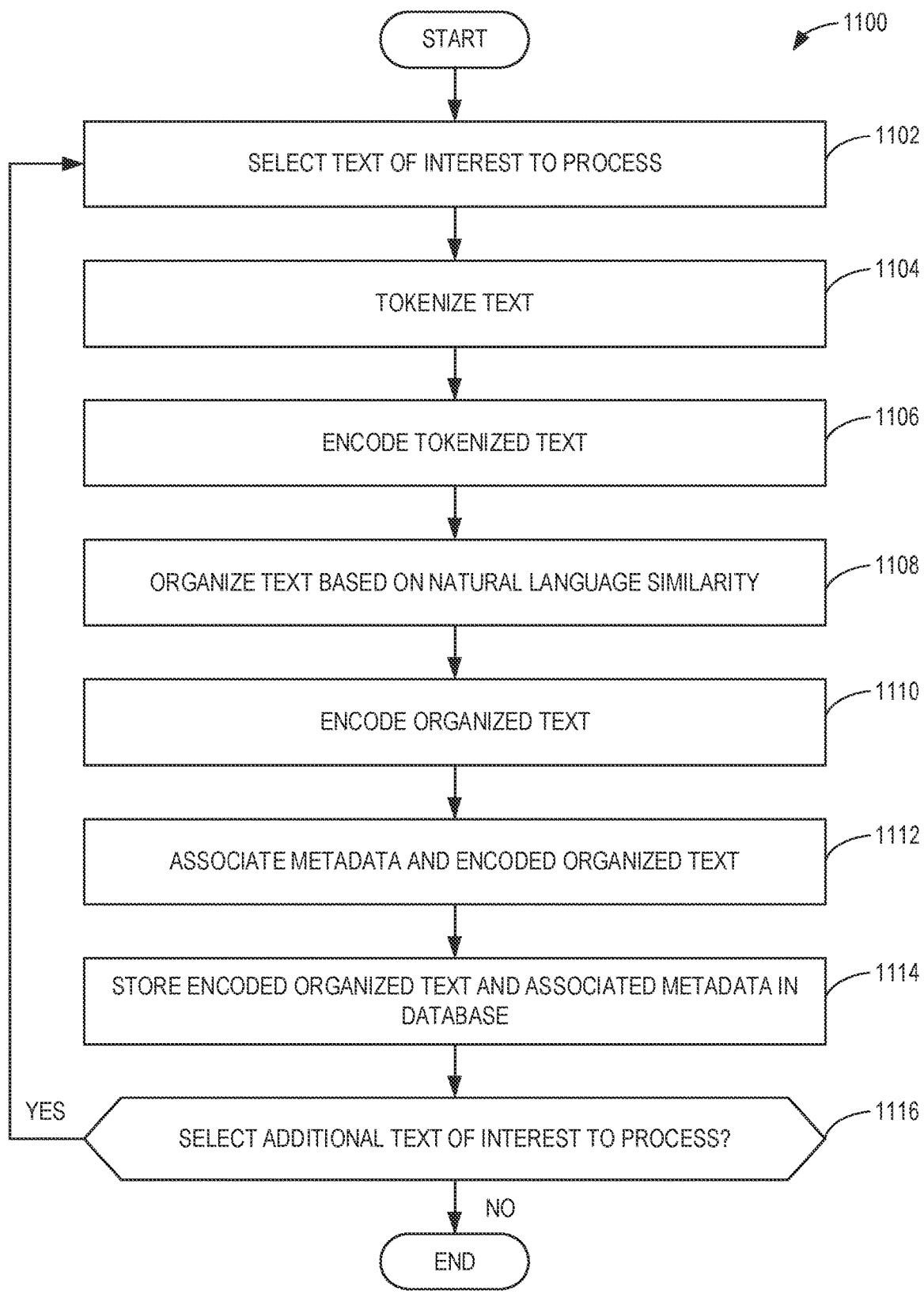
FIG. 11 is a flowchart representative of example machine readable instructions that may be executed to implement the example context search controller of FIGS. 1, 2, and/or 3 to index example content for information retrieval.
Figure 12:
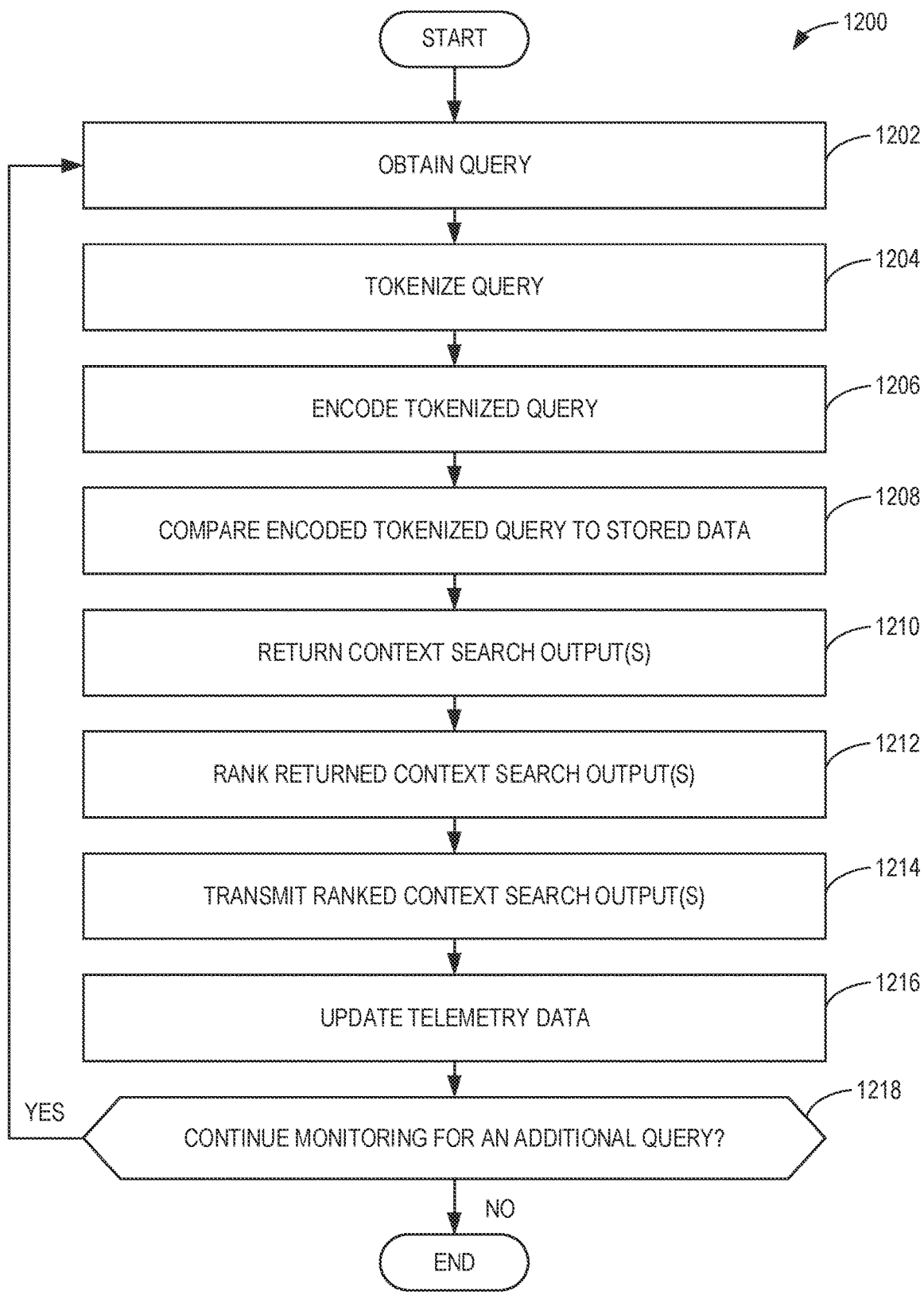
FIG. 12 is a flowchart representative of example machine readable instructions that may be executed to implement the example context search controller of FIGS. 1, 2, and/or 3 to generate information retrieval results in response to a query.
Figure 13:
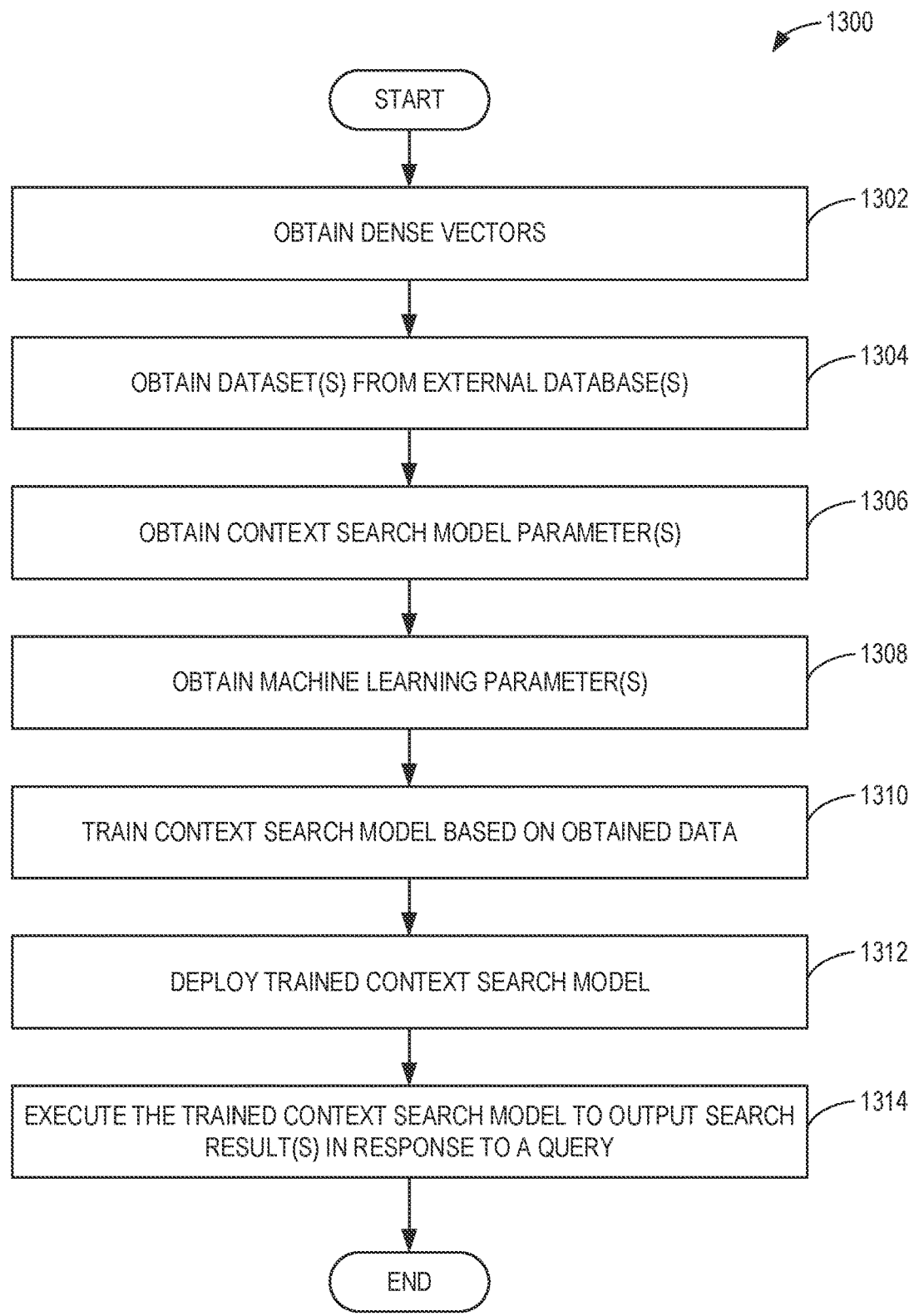
FIG. 13 is a flowchart representative of example machine readable instructions that may be executed to implement the example context search controller of FIGS. 1, 2, and/or 3 to train an example context search model to index and/or execute information retrieval queries.

Flowcharts representative of example hardware logic, machine readable instructions, hardware implemented state machines, and/or any combination thereof for implementing the example context search controller 102 of FIGS. 1, 2, and/or 3, the example central facility 112 of FIGS. 1 and/or 3, the example computing device(s) 104, 106, 108 of FIG. 1, the example context search application 110 of FIGS. 1, 3, and/or 4, and/or the example computing device 400 of FIG. 4, is/are shown in FIGS. 11-13. The machine readable instructions may be one or more executable programs or portion(s) of an executable program for execution by a computer processor and/or processor circuitry, such as the processor 1412 shown in the example processor platform 1400 discussed below in connection with FIG. 14 and/or the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1412 of FIG. 14 and/or the processor 1512 of FIG. 15, but the entire program and/or parts thereof could alternatively be executed by a device other than the processor 1412 of FIG. 14, the processor 1512 of FIG. 15, and/or embodied in firmware or dedicated hardware. Further, although the example program is described with reference to the flowcharts illustrated in FIGS. 11-13, many other methods of implementing the example context search controller 102 of FIGS. 1, 2, and/or 3, the example central facility 112 of FIGS. 1 and/or 3, the example computing device(s) 104, 106, 108 of FIG. 1, the example context search application 110 of FIGS. 1, 3, and/or 4, and/or the example computing device 400 of FIG. 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a DLL), an SDK, an API, etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), SQL, Swift, etc.

As mentioned above, the example processes of FIGS. 11-13 may be implemented using executable instructions (e.g., computer and/or machine readable instructions) stored on a non-transitory computer and/or machine readable medium such as an HDD, a flash memory, a read-only memory, a CD, a DVD, a cache, a RAM, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 11 is a flowchart representative of example machine readable instructions 1100 that may be executed to implement the example context search controller 102 of FIGS. 1, 2, and/or 3, the example central facility 112 of FIGS. 1 and/or 3, the example computing device(s) 104, 106, 108 of FIG. 1, the example context search application 110 of FIGS. 1, 3, and/or 4, and/or the example computing device 400 of FIG. 4, to index example content for information retrieval. The machine readable instructions 1100 of FIG. 11 begin at block 1102, at which the context search controller 102 selects text of interest to process. For example, the query handler 210 (FIG. 2) can select the text 600 of FIG. 6 to process.

At block 1104, the context search controller 102 tokenizes the text. For example, the text tokenizer 220 (FIG. 2) can tokenize the text 600 into the sentences 602, 604, 606, 608 of FIG. 6. At block 1106, the context search controller 102 encodes the tokenized text. For example, the text encoder 230 (FIG. 2) can encode and/or otherwise convert the sentences 602, 604, 606, 608 into a respective one of the vectors 702, 704, 706, 708 of FIG. 7.

At block 1108, the context search controller 102 organizes text based on natural language similarity. For example, the text organizer 240 (FIG. 2) can execute one or more natural language tasks to organize the text 600 of FIG. 6 into the re-organized text 800 of FIG. 8 based on the vectors 700 of FIG. 7.

At block 1110, the context search controller 102 encodes the organized text. For example, the text encoder 230 can encode the re-organized text 800 of FIG. 8 into vectors (e.g., the dense vectors 284 of FIG. 2). At block 1112, the context search controller 102 associates metadata and the encoded organized text. For example, the search result generator 250 (FIG. 2) can associate metadata (e.g., a title of an article, a uniform resource locator (URL) of an article, text of an article, an article identifier (ID), etc.), etc., with the corresponding one(s) of the dense vectors 284.

At block 1114, the context search controller 102 stores the encoded organized text and associated metadata in a database. For example, the search result generator 250 can store the re-organized text 800 encoded as dense vectors as the dense vectors 284 in the storage 280 (FIG. 2). At block 1116, the context search controller 102 determines whether to select additional text of interest to process. If, at block 1116, the context search controller 102 determines to select additional text (e.g., additional content, another article, another portion of the first content database(s) 122, etc.), control returns to block 1102 to select the additional text of interest to process. If, at block 1116, the context search controller 102 determines not to select additional text, the machine readable instructions 1100 of FIG. 11 conclude.

FIG. 12 is a flowchart representative of example machine readable instructions 1200 that may be executed to implement the example context search controller 102 of FIGS. 1, 2, and/or 3, the example central facility 112 of FIGS. 1 and/or 3, the example computing device(s) 104, 106, 108 of FIG. 1, the example context search application 110 of FIGS. 1, 3, and/or 4, and/or the example computing device 400 of FIG. 4, to generate information retrieval results in response to a query. The machine readable instructions 1200 of FIG. 12 begin at block 1202, at which the context search controller 102 obtains a query. For example, the query handler 210 (FIG. 2) can obtain the query 902 of FIG. 9. In some examples, the query 902 can be provided to the context search application 110 via the user interface 420. For example, a user of the context search application 110, and/or, more generally the computing device 400, can enter, type, and/or otherwise provide the query 902 to the context search application 110 via the user interface 420.

At block 1204, the context search controller 102 tokenizes the query. For example, the text tokenizer 220 (FIG. 2) can tokenize the query 902 into text portions, such as sentences, paragraphs, etc.

At block 1206, the context search controller 102 encodes the tokenized query. For example, the text encoder 230 (FIG. 2) can encode the query 902 into the vector 904 of FIG. 9.

At block 1208, the context search controller 102 compares the encoded tokenized query to stored data. For example, the search result generator 250 (FIG. 2) can compare the vector 904 of FIG. 9 to the dense vectors 284 (FIG. 2) stored in the storage 280 (FIG. 2).

At block 1210, the context search controller 102 returns context search output(s). For example, the search result generator 250 can generate the information retrieval results 906 of FIG. 9 in response to the query 902.

At block 1212, the context search controller 102 ranks the returned context search output(s). For example, the search result ranker 260 (FIG. 2) can rank the information retrieval results 906 of FIG. 9 to generate the information retrieval results 1000 of FIG. 10.

At block 1214, the context search controller 102 transmits the ranked context search output(s). For example, the query handler 210, and/or, more generally, the context search model 200 (FIG. 2), can transmit the information retrieval results 1000 of FIG. 10 to one(s) of the computing device(s) 104, 106, 108 of FIG. 1, the computing device 400 of FIG. 4, etc. In some examples, the query handler 210, and/or, more generally, the context search model 200, can transmit the information retrieval results 1000 to a user interface, a display (e.g., a user interface on a display), etc., such as the user interface 420 of FIG. 4.

At block 1216, the context search controller 102 updates telemetry data. For example, the search result generator 250, the search result ranker 260, and/or, more generally, the context search model 200, can generate telemetry data and/or store the telemetry data as the first telemetry data 344 of FIG. 3. In some examples, the telemetry agent 310 (FIG.

3) obtains the third telemetry data 436 of FIG. 4 and/or stores the third telemetry data 436 as the second telemetry data 346 of FIG. 3.

At block 1218, the context search controller 102 determines whether to continue monitoring for an additional query. For example, the query handler 210 can determine whether to continue monitoring for an additional query. In some examples, the query handler 210 can determine whether another query has been received from one(s) of the computing device(s) 104, 106, 108. If, at block 1218, the context search controller 102 determines to continue monitoring for an additional query, control returns to block 1202 to obtain another query, otherwise the example machine readable instructions 1200 of FIG. 12 conclude.

FIG. 13 is a flowchart representative of example machine readable instructions 1300 that may be executed to implement the example context search controller 102 of FIGS. 1, 2, and/or 3, the example central facility 112 of FIGS. 1 and/or 3, the example computing device(s) 104, 106, 108 of FIG. 1, the example context search application 110 of FIGS. 1, 3, and/or 4, and/or the example computing device 400 of FIG. 4, to train an example context search model to index and/or execute information retrieval queries. The machine readable instructions 1300 of FIG. 13 begin at block 1302, at which the context search controller 102 obtains dense vectors at block 1302. For example, the context search model trainer 270 (FIG. 2) can obtain the dense vectors 284 (FIG. 2).

At block 1304, the context search controller 102 obtains dataset(s) from external database(s). For example, the context search model trainer 270 can obtain dataset(s) from the first content database(s) 114 of FIG. 1 and store the obtained dataset(s) as the training data 282 of FIG. 2 in the storage 280 (FIG. 2). In some such examples, the context search model trainer 270 can obtain the training data 282 from the storage 280.

At block 1306, the context search controller 102 obtains context search model parameter(s). For example, the context search model trainer 270 can obtain a configuration, a setting, etc., of a text tokenizer (e.g., a sentence tokenizer), a text encoder (e.g., a vector generator), a natural language task, etc., from a user, a server, the storage 280, etc. In some examples, the configuration, the setting, etc., may be determined by one or more AI/ML models.

At block 1308, the context search controller 102 obtains machine learning parameter(s). For example, the context search model trainer 270 can obtain a configuration, a hyperparameter, a setting, etc., of one or more AI/ML model(s) from a user, a server, the storage 280, etc.

At block 1310, the context search controller 102 trains a context search model based on the obtained data. For example, the context search model trainer 270 can train the search result generator 250 (FIG. 2), the search result ranker 260 (FIG. 2), and/or, more generally, the context search model 200 (FIG. 2), based on the training data 282, the dense vectors 284, one or more context search model parameters, one or more machine learning parameters, etc., and/or a combination thereof.

At block 1312, the context search controller 102 deploys the trained context search model. For example, the context search model trainer 270 can generate an executable, a machine readable file, etc., that, when executed, can index content and/or retrieve results in response to a query. In some such examples, the application generator 320 (FIG. 3) can generate the context search controller 102. In some such examples, the context search model trainer 270 can invoke the application generator 330 to generate and/or update the context search controller 102 in response to training the context search model 200.

At block 1314, the context search controller 102 executes the trained context search model to output search result(s) in response to a query. For example, the network interface 120 (FIGS. 1 and/or 2) can obtain a query from one of the computing devices 104, 106, 108 of FIG. 1. In some examples, the context search controller 102 can execute the context search model 200 to generate one or more search results based on the context of the received query. In response to executing the trained context search model to output search result(s) in response to a query at block 1314, the example machine readable instructions 1300 of FIG. 13 conclude.

Alternatively, in some examples, the machine readable instructions 1300 of FIG. 13 may be re-executed to facilitate re-training of the context search model 200. In some such examples, the context search model trainer 270 can re-execute the machine readable instructions 1300 of FIG. 13 in response to pre-determined criteria, a pre-defined threshold of accuracy, etc., and/or a combination thereof being satisfied. For example, the context search model trainer 270 can obtain the search result(s) generated at block 1314 as feedback. In some such examples, the context search model trainer 270 can determine an accuracy of the context search model 200 based on the feedback. In some examples, the context search model trainer 270 can re-trigger execution of the machine readable instructions 1300 in response to a determination that the accuracy (e.g., 60%, 70%, etc.) of the context search model trainer 270 falls below an accuracy threshold (e.g., 80%, 90%, etc.). In some examples, the context search model trainer 270 can re-trigger execution of the machine readable instructions 1300 in response to a determination that a quantity of the training data 282 has exceeded a threshold quantity of training data (e.g., a quantity of training data not yet processed and/or otherwise utilized to train the context search model 200).

Figure 14:
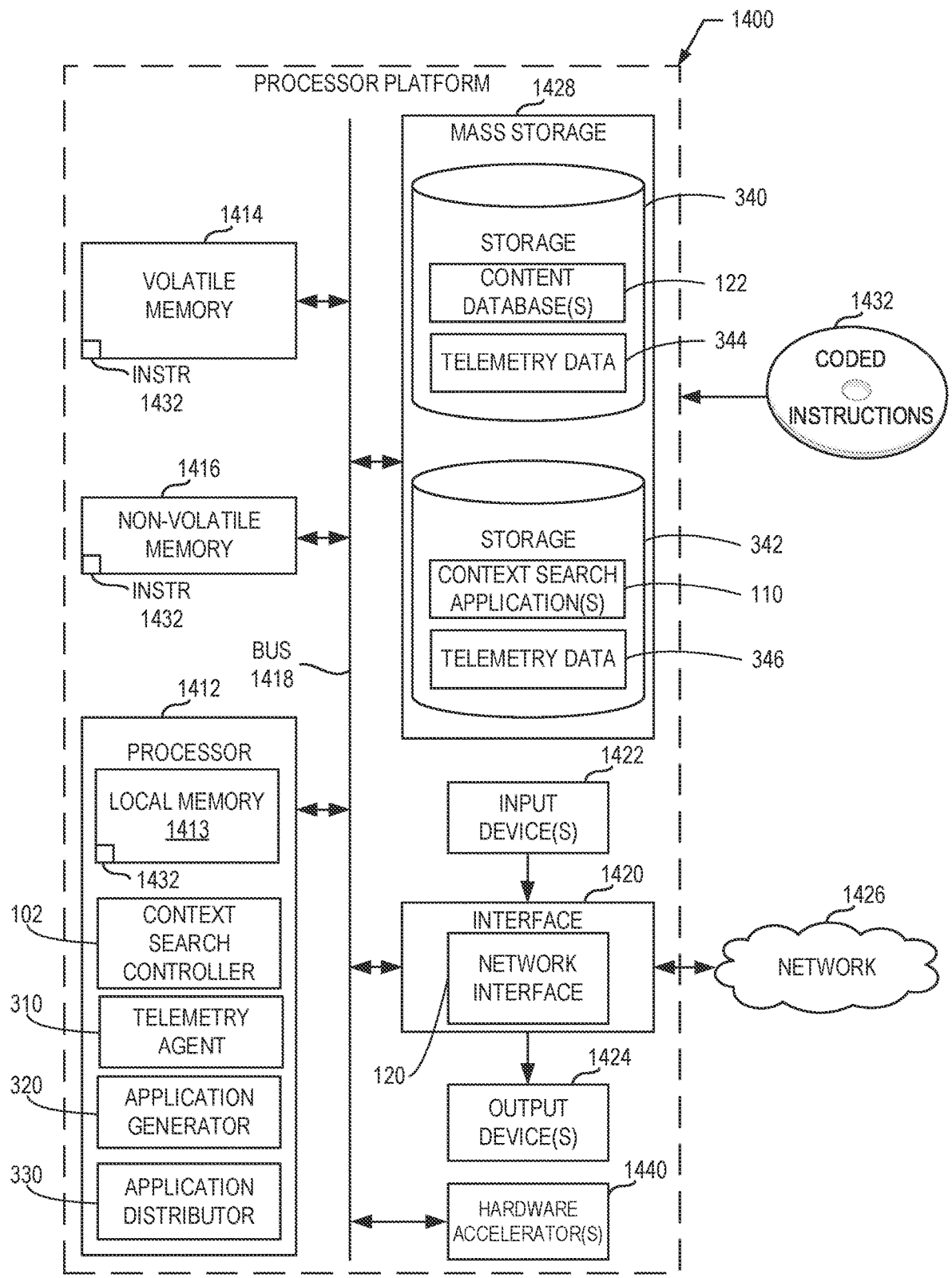
FIG. 14 is a block diagram of an example processing platform structured to execute the example machine readable instructions of FIGS. 11-13 to implement the example central facility of FIGS. 1 and/or 3.

FIG. 14 is a block diagram of an example processor platform 1400 structured to execute the instructions of FIGS. 11, 12, and/or 13 to implement the example central facility 112 of FIGS. 1 and/or 3. The processor platform 1400 can be, for example, a server, a personal computer, a workstation, a self-learning machine (e.g., a neural network), or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1412 implements the example context search controller 102 of FIGS. 1, 2, and/or 3, the example telemetry agent 310 of FIG. 3, the example application generator 320 of FIG. 3, and the example application distributor 330 of FIG. 3.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by SDRAM, DRAM, RDRAM®, and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1420 implements the network interface 120 of FIGS. 1 and/or 3.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and DVD drives. In the example of FIG. 14, the one or more mass storage devices 1428 implement the first example storage 340 of FIG. 3, the first example content database(s) 122 of FIGS. 1 and/or 3, the first example telemetry data 344 of FIG. 3, the second example storage 342 of FIG. 3, the example context search application(s) 110 of FIGS. 1, 3, and/or 4, and the second example telemetry data 346 of FIG. 3.

The machine executable instructions 1432 of FIGS. 11, 12, and/or 13 may be stored in the mass storage device 1428, in the volatile memory 1414, in the non-volatile memory 1416, and/or on a removable non-transitory computer readable storage medium such as a CD or DVD.

The processor platform 1400 of the illustrated example of FIG. 14 includes example hardware accelerator(s) 1440. For example, the hardware accelerator(s) 1440 can be implemented by one or more GPUs, one or more neural network processors, one or more vector processing units, one or more AI/ML processors, etc., or any other type of hardware from any desired family or manufacturer that can be used to execute an AI/ML model. In this example, the hardware accelerator(s) 1440 are in communication with different hardware of the processor platform 1400, such as the processor 1412, the volatile memory 1414, the non-volatile memory 1416, etc., via the bus 1418. In some examples, one or more of the example context search controller 102, the example telemetry agent 310, the example application generator 320, and/or the example application distributor 330 of FIG. 3 can be implemented by, in, or with the hardware accelerator(s) 1440 instead of or in addition to the processor 1412.

Figure 15:
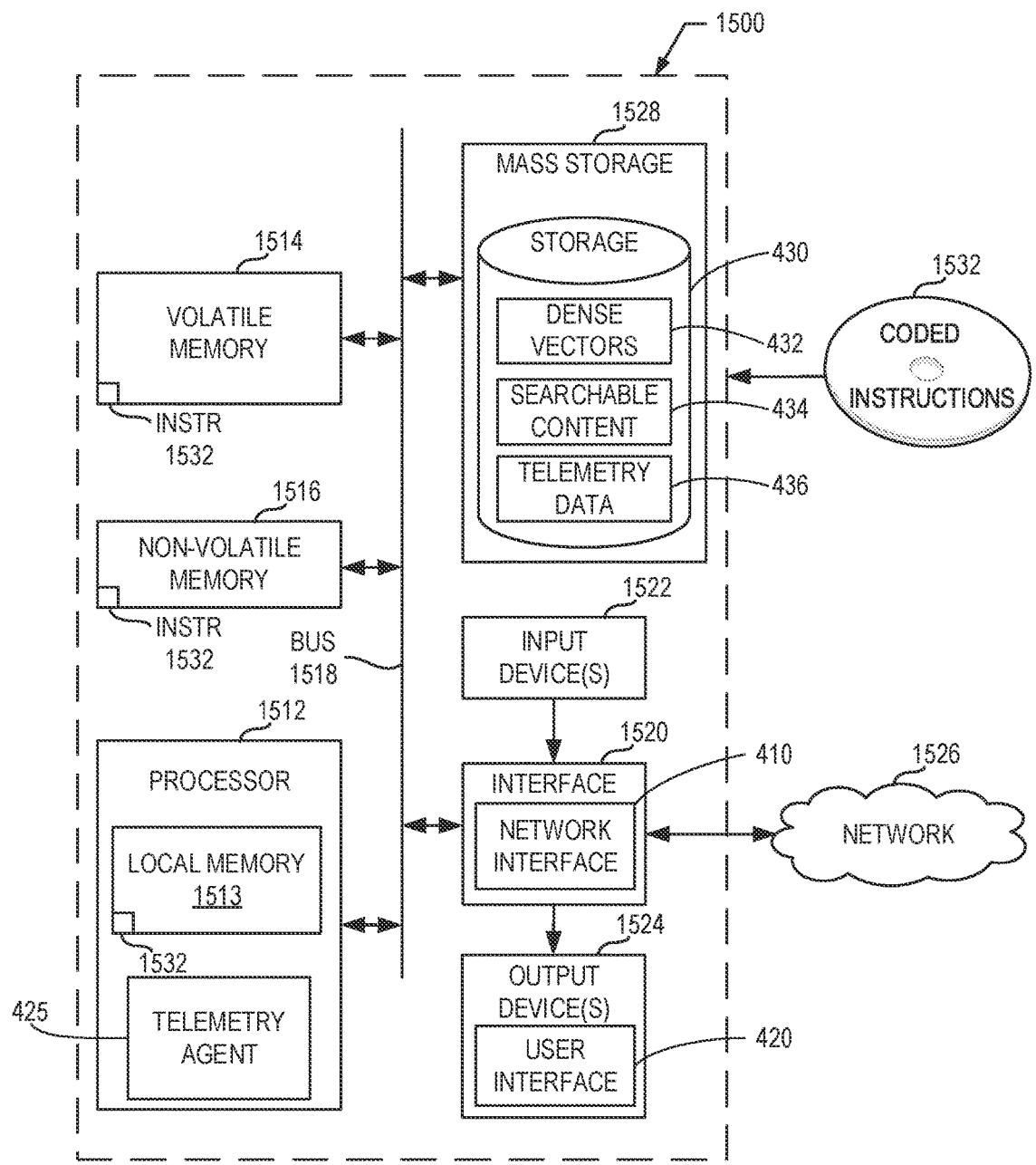
FIG. 15 is a block diagram of an example processing platform structured to execute the example machine readable instructions of FIGS. 11-13 to implement the example computing devices of FIGS. 1 and/or 4.

FIG. 15 is a block diagram of an example processor platform 1500 structured to execute the instructions of FIGS. 11, 12, and/or 13 to implement the first computing device 104 of FIG. 1, the second computing device 106 of FIG. 1, the third computing device 108 of FIG. 1, and/or the computing device 400 of FIG. 4. For example, the first computing device 104 of FIG. 1, the second computing device 106 of FIG. 1, the third computing device 108 of FIG. 1, and/or the computing device 400 of FIG. 4 may be implemented by the processor platform 1500.

The processor platform 1500 of the illustrated example can be, for example, a server, a personal computer, a workstation, a self-learning machine (e.g., a neural network), a mobile device (e.g., a cell phone, a smart phone, a tablet such as an iPad™), a television, a PDA, an Internet appliance, a DVD player, a CD player, a digital video recorder, a Blu-ray player, a gaming console, a personal video recorder, a set top box, a headset or other wearable device, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1512 implements the telemetry agent 425 of FIG. 4.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by SDRAM, DRAM, RDRAM®, and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a USB, a Bluetooth® interface, an NFC interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1524 are also connected to the interface circuit 1520 of the illustrated example. The output devices 1524 can be implemented, for example, by display devices (e.g., an LED, an OLED, a LCD, a CRT display, an IPS display, a touchscreen, etc.), a tactile output device, a printer, and/or speaker. The interface circuit 1520 of the illustrated example, thus, typically includes a graphics driver card, a graphics driver chip and/or a graphics driver processor. In the example of FIG. 15, the one or more output devices 1524 implement the user interface 420 of FIG. 4.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a DSL connection, a telephone line connection, a coaxial cable system, a satellite system, a line-of-site wireless system, a cellular telephone system, etc. In the example of FIG. 15, the interface 1520 implements the network interface 410 of FIG. 4.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and DVD drives. In the example of FIG. 15, the one or more mass storage devices 1528 implement the example storage 430, the example dense vectors 432, the example searchable content 434, and the third example telemetry data 436 of FIG. 4.

The machine executable instructions 1532 of FIGS. 11, 12, and/or 13 may be stored in the mass storage device 1528, in the volatile memory 1514, in the non-volatile memory 1516, and/or on a removable non-transitory computer readable storage medium such as a CD or DVD.

Figure 16:
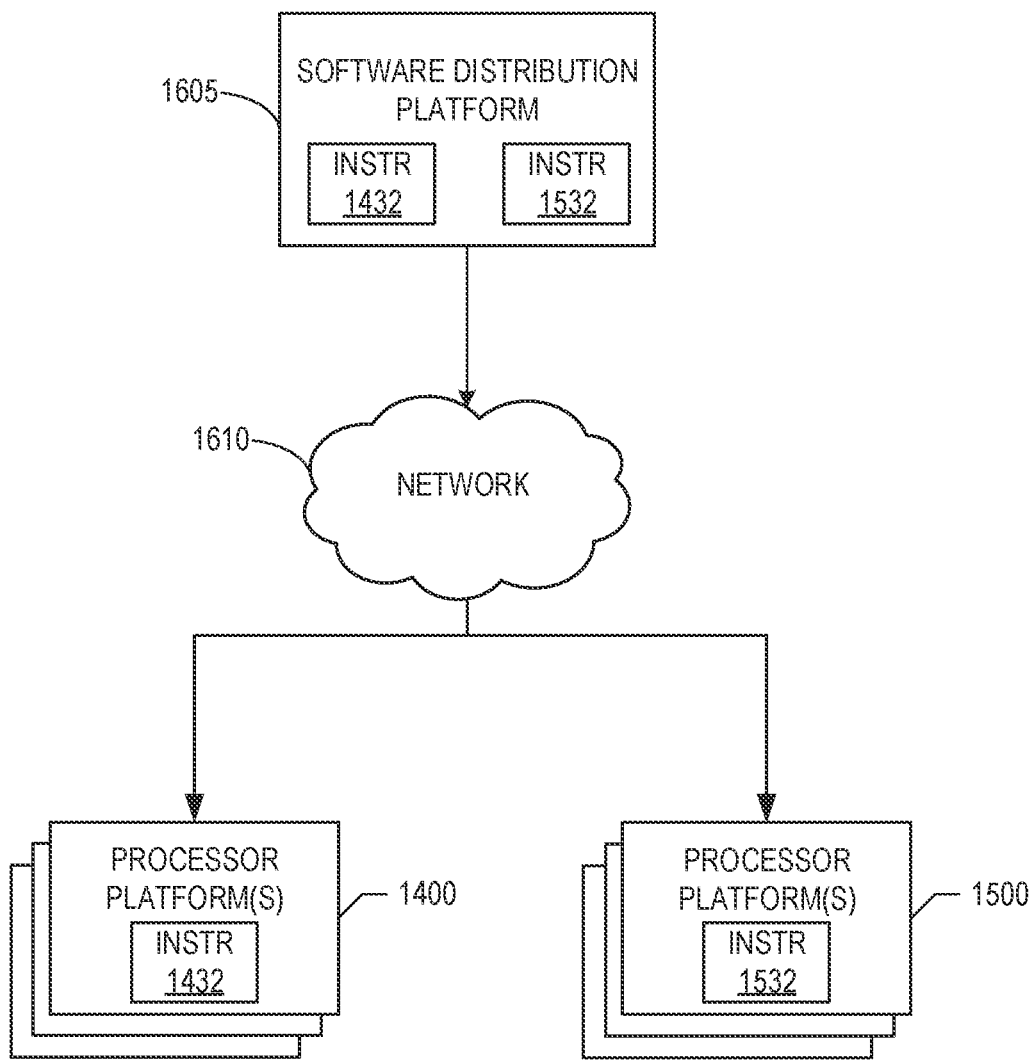
FIG. 16 is a block diagram of an example software distribution platform to distribute software (e.g., software corresponding to the example computer readable instructions of FIGS. 11-13) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1605 to distribute software such as the example machine readable instructions 1432 of FIG. 14 and/or the example machine readable instructions 1532 of FIG. 15 to third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, a vendor, and/or a licensor of software such as the example machine readable instructions 1432 of FIG. 14, the example machine readable instructions 1532 of FIG. 15, etc. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the computer readable instructions 1432, 1532, which may correspond to the example machine readable instructions 1100, 1200, 1300 of FIGS. 11, 12, and/or 13, as described above. The one or more servers of the example software distribution platform 1605 are in communication with a network 1610, which may correspond to any one or more of the Internet and/or any of the example networks 116, 118, 1426, 1526 described above in connection with FIGS. 1, 14, and/or 15. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1432, 1532 from the software distribution platform 1605. For example, the software, which may correspond to the example computer readable instructions 1432 of FIG. 14, the example computer readable instructions 1532 of FIG. 15, etc., may be downloaded to the example processor platform 1400 of FIG. 14, the example processor platform 1500 of FIG. 15, etc., which is/are to execute the computer readable instructions 1432, 1532 to implement the computing device(s) 104, 106, 108 of FIG. 1, the central facility 112 of FIGS. 1 and/or 3, the computing device 400 of FIG. 4, etc. In some example, one or more servers of the software distribution platform 1605 periodically offer, transmit, and/or force updates to the software (e.g., the example computer readable instructions 1432 of FIG. 14, the example computer readable instructions 1532 of FIG. 15, etc.) to ensure improvements, patches, updates, etc. are distributed and applied to the software at the end user devices.

From the foregoing, it will be appreciated that example systems, methods, apparatus, and articles of manufacture have been disclosed that effectuate context-driven, keyword-agnostic information retrieval. The disclosed systems, methods, apparatus, and articles of manufacture improve the efficiency of using a computing device by retrieving information, irrespective of the specific language a search query contains, by focusing on the context implied by the connotations of the words used. Advantageously, the disclosed methods, apparatus, and articles of manufacture can process requests for content with less resources (e.g., hardware, software, and/or firmware resources) compared to other information retrieval techniques. Advantageously, the disclosed methods, apparatus, and articles of manufacture can identify content in response to a query with increased accuracy compared to other information retrieval techniques. The disclosed methods, apparatus, and articles of manufacture are accordingly directed to one or more improvement(s) in the functioning of a computer.

Example methods, apparatus, systems, and articles of manufacture for context-driven search are disclosed herein. Further examples and combinations thereof include the following:

Example 1 includes an apparatus comprising memory to store machine-readable instructions, and at least one processor to execute the machine-readable instructions to at least tokenize text included in a query for content into text portions, encode the text portions into respective vectors, organize the text portions based on natural language similarity of the text portions, the natural language similarity based on the respective vectors, generate one or more search results based on the organized text portions, and rank the one or more search results for presentation on a computing device.

Example 2 includes the apparatus of example 1, wherein the at least one processor is to obtain the query from the computing device via a network, and transmit the one or more search results to the computing device via the network.

Example 3 includes the apparatus of example 1, wherein the content includes at least one of an information article, a biography, an audio record, an image, or a video.

Example 4 includes the apparatus of example 1, wherein the text portions include a first sentence having a first vector of the respective vectors and a second sentence having a second vector of the respective vectors, the natural language similarity is a cosine similarity, and the at least one processor is to determine a value of the cosine similarity based on a comparison of the first vector and the second vector, and in response to the value satisfying a threshold, associate the first sentence and the second sentence.

Example 5 includes the apparatus of example 1, wherein the content is first content, and the at least one processor is to train a machine-learning model based on training data including second content, and execute the machine-learning model with the organized text portions as inputs, the machine-learning model to generate the one or more search results.

Example 6 includes the apparatus of example 5, wherein the machine-learning model is a first machine-learning model, the training data is first training data, and the at least one processor is to train a second machine-learning model based on second training data including at least one of the second content or third content, and execute the second machine-learning model with the one or more search results as one or more inputs, the second machine-learning model to generate the one or more ranked search results.

Example 7 includes the apparatus of example 6, wherein at least one of the first machine-learning model or the second machine-learning model is a neural network, a Learning-to-Rank model, a Long Short-Term Memory model, or a Transformer model.

Example 8 includes the apparatus of example 1, wherein the at least one processor is to generate an application including a user interface to obtain the query and a telemetry agent to generate telemetry data based on the query, and transmit the application to a computing device via a network, the computing device to execute the application in response to the transmitting.

Example 9 includes the apparatus of example 1, wherein the content is first content, and the at least one processor is to encode one or more portions of second content, organize the one or more portions based on the natural language similarity of the one or more portions, associate metadata with the one or more portions, and store an association of the metadata and a first one of the one or more portions in a database, the one or more search results based on the association.

Example 10 includes at least one computer readable medium comprising instructions that, when executed, cause at least one processor to at least tokenize text included in a query for content into text portions, encode the text portions into respective vectors, organize the text portions based on natural language similarity of the text portions, the natural language similarity based on the respective vectors, generate one or more search results based on the organized text portions, and rank the one or more search results for presentation on a computing device.

Example 11 includes the at least one computer readable medium of example 10, wherein the instructions, when executed, cause the at least one processor to obtain the query from the computing device via a network, and transmit the one or more search results to the computing device via the network.

Example 12 includes the at least one computer readable medium of example 10, wherein the content includes at least one of an information article, a biography, an audio record, an image, or a video.

Example 13 includes the at least one computer readable medium of example 10, wherein the text portions include a first sentence having a first vector of the respective vectors and a second sentence having a second vector of the respective vectors, the natural language similarity is a cosine similarity, and the instructions, when executed, cause the at least one processor to determine a value of the cosine similarity based on a comparison of the first vector and the second vector, and in response to the value satisfying a threshold, associate the first sentence and the second sentence.

Example 14 includes the at least one computer readable medium of example 10, wherein the content is first content, and the instructions, when executed, cause the at least one processor to train a machine-learning model based on training data including second content, and execute the machine-learning model with the organized text portions as inputs, the machine-learning model to generate the one or more search results.

Example 15 includes the at least one computer readable medium of example 14, wherein the machine-learning model is a first machine-learning model, the training data is first training data, and the instructions, when executed, cause the at least one processor to train a second machine-learning model based on second training data including at least one of the second content or third content, and execute the second machine-learning model with the one or more search results as one or more inputs, the second machine-learning model to generate the one or more ranked search results.

Example 16 includes the at least one computer readable medium of example 15, wherein at least one of the first machine-learning model or the second machine-learning model is a neural network, a Learning-to-Rank model, a Long Short-Term Memory model, or a Transformer model.

Example 17 includes the at least one computer readable medium of example 10, wherein the instructions, when executed, cause the at least one processor to generate an application including a user interface to obtain the query and a telemetry agent to generate telemetry data based on the query, and transmit the application to a computing device via a network, the computing device to execute the application in response to the transmitting.

Example 18 includes the at least one computer readable medium of example 10, wherein the content is first content, and the instructions, when executed, cause the at least one processor to encode one or more portions of second content, organize the one or more portions based on the natural language similarity of the one or more portions, associate metadata with the one or more portions, and store an association of the metadata and a first one of the one or more portions in a database, the one or more search results based on the association.

Example 19 includes an apparatus comprising a text tokenizer to tokenize text included in a query for content into text portions, a text encoder to encode the text portions into respective vectors, a text organizer to organize the text portions on natural language similarity of the text portions, the natural language similarity based on the respective vectors, a search result generator to generate one or more search results based on the organized text portions, and a search result ranker to rank the one or more search results for presentation on a computing device.

Example 20 includes the apparatus of example 19, further including a query handler to obtain the query from the computing device via a network, and a network interface to transmit the one or more search results to the computing device via the network.

Example 21 includes the apparatus of example 19, wherein the content includes at least one of an information article, a biography, an audio record, an image, or a video.

Example 22 includes the apparatus of example 19, wherein the text portions include a first sentence having a first vector of the respective vectors and a second sentence having a second vector of the respective vectors, the natural language similarity is a cosine similarity, and the text organizer is to determine a value of the cosine similarity based on a comparison of the first vector and the second vector, and in response to the value satisfying a threshold, associate the first sentence and the second sentence.

Example 23 includes the apparatus of example 19, wherein the content is first content, and further including a context search model trainer to train a machine-learning model based on training data including second content, and the search result generator to execute the machine-learning model with the organized text portions as inputs, the machine-learning model to generate the one or more search results.

Example 24 includes the apparatus of example 23, wherein the machine-learning model is a first machine-learning model, the training data is first training data, and wherein the context search model trainer is to train a second machine-learning model based on second training data including at least one of the second content or third content, and the search result ranker is to execute the second machine-learning model with the one or more search results as one or more inputs, the second machine-learning model to generate the one or more ranked search results.

Example 25 includes the apparatus of example 24, wherein at least one of the first machine-learning model or the second machine-learning model is a neural network, a Learning-to-Rank model, a Long Short-Term Memory model, or a Transformer model.

Example 26 includes the apparatus of example 19, further including an application generator to generate an application including a user interface to obtain the query and a telemetry agent to generate telemetry data based on the query, and an application distributor to transmit the application to a computing device via a network, the computing device to execute the application in response to the transmitting.

Example 27 includes the apparatus of example 19, wherein the content is first content, and wherein the text encoder is to encode one or more portions of second content, the text organizer is to organize the one or more portions based on the natural language similarity of the one or more portions, and the search result generator is to associate metadata with the one or more portions, and store an association of the metadata and a first one of the one or more portions in a database, the one or more search results based on the association.

Example 28 includes an apparatus comprising means for tokenizing text included in a query for content into text portions, means for encoding the text portions into respective vectors, means for organizing the text portions based on natural language similarity of the text portions, the natural language similarity based on the respective vectors, means for generating one or more search results based on the organized text portions, and means for ranking the one or more search results for presentation on a computing device.

Example 29 includes the apparatus of example 28, further including means for obtaining the query from the computing device via a network, and means for transmitting the one or more search results to the computing device via the network.

Example 30 includes the apparatus of example 28, wherein the content includes at least one of an information article, a biography, an audio record, an image, or a video.

Example 31 includes the apparatus of example 28, wherein the text portions include a first sentence having a first vector of the respective vectors and a second sentence having a second vector of the respective vectors, the natural language similarity is a cosine similarity, and the means for organizing is to determine a value of the cosine similarity based on a comparison of the first vector and the second vector, and in response to the value satisfying a threshold, associate the first sentence and the second sentence.

Example 32 includes the apparatus of example 28, wherein the content is first content, and further including means for training a machine-learning model based on training data including second content, and the means for generating to execute the machine-learning model with the organized text portions as inputs, the machine-learning model to generate the one or more search results.

Example 33 includes the apparatus of example 32, wherein the machine-learning model is a first machine-learning model, the training data is first training data, and wherein the means for training is to train a second machine-learning model based on second training data including at least one of the second content or third content, and the means for ranking is to execute the second machine-learning model with the one or more search results as one or more inputs, the second machine-learning model to generate the one or more ranked search results.

Example 34 includes the apparatus of example 33, wherein at least one of the first machine-learning model or the second machine-learning model is a neural network, a Learning-to-Rank model, a Long Short-Term Memory model, or a Transformer model.

Example 35 includes the apparatus of example 28, further including means for compiling an application including a user interface to obtain the query and a telemetry agent to generate telemetry data based on the query, and means for distributing the application to a computing device via a network, the computing device to execute the application in response to the transmitting.

Example 36 includes the apparatus of example 28, wherein the content is first content, and wherein the means for encoding is to encode one or more portions of second content, the means for organizing is to organize the one or more portions based on the natural language similarity of the one or more portions, and the means for generating is to associate metadata with the one or more portions, and store an association of the metadata and a first one of the one or more portions in a database, the one or more search results based on the association.

Example 37 includes a method comprising tokenizing text included in a query for content into text portions, encoding the text portions into respective vectors, organizing the text portions based on natural language similarity of the text portions, the natural language similarity based on the respective vectors, generating one or more search results based on the organized text portions, and ranking the one or more search results for presentation on a computing device.

Example 38 includes the method of example 37, further including obtaining the query from the computing device via a network, and transmitting the one or more search results to the computing device via the network.

Example 39 includes the method of example 37, wherein the content includes at least one of an information article, a biography, an audio record, an image, or a video.

Example 40 includes the method of example 37, wherein the text portions include a first sentence having a first vector of the respective vectors and a second sentence having a second vector of the respective vectors, the natural language similarity is a cosine similarity, and further including determining a value of the cosine similarity based on a comparison of the first vector and the second vector, and in response to the value satisfying a threshold, associating the first sentence and the second sentence.

Example 41 includes the method of example 37, wherein the content is first content, and further including training a machine-learning model based on training data including second content, and executing the machine-learning model with the organized text portions as inputs, the machine-learning model to generate the one or more search results.

Example 42 includes the method of example 41, wherein the machine-learning model is a first machine-learning model, the training data is first training data, and further including training a second machine-learning model based on second training data including at least one of the second content or third content, and executing the second machine-learning model with the one or more search results as one or more inputs, the second machine-learning model to generate the one or more ranked search results.

Example 43 includes the method of example 42, wherein at least one of the first machine-learning model or the second machine-learning model is a neural network, a Learning-to-Rank model, a Long Short-Term Memory model, or a Transformer model.

Example 44 includes the method of example 37, further including generating an application including a user interface to obtain the query and a telemetry agent to generate telemetry data based on the query, and transmitting the application to a computing device via a network, the computing device to execute the application in response to the transmitting.

Example 45 includes the method of example 37, wherein the content is first content, and further including encoding one or more portions of second content, organizing the one or more portions based on the natural language similarity of the one or more portions, associating metadata with the one or more portions, and storing an association of the metadata and a first one of the one or more portions in a database, the one or more search results based on the association.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
memory to store machine-readable instructions; and
at least one processor to execute the machine-readable instructions to at least:
tokenize text from content into text portions, the text portions including a first text portion and a second text portion;
execute a first machine-learning model with the text portions as input to the first machine-learning model to encode the first text portion to define a first vector and encode the second text portion to define a second vector, the first machine-learning model to output the first vector and the second vector, the first machine-learning model trained with contextually similar text data and context corresponding to the contextually similar text data, the context associated with a pattern represented by the contextually similar text data;
determine, based on a comparison between the first vector and the second vector, a natural language similarity between the first text portion and the second text portion;
in response to the natural language similarity satisfying a threshold, combine the first text portion and the second text portion to generate a third text portion;
encode the third text portion to define a third vector different from the first vector and the second vector;
cause storage of the third vector to define a vector database;
query the vector database to extract related search results from the vector database by comparing the third vector to a query vector corresponding to a query; and
execute a second machine-learning model different from the first machine-learning model with the related search results as input to the second machine-learning model to generate rankings of the related search results as output from the second machine-learning model for presentation on a computing device, the second machine-learning model trained with data corresponding to at least one query and search results associated with the at least one query.

2. The apparatus of claim 1, wherein the at least one processor is to execute the machine-readable instructions to:
obtain the query from the computing device via a network; and
transmit the related search results to the computing device via the network.

3. The apparatus of claim 1, wherein the content includes at least one of an information article, a biography, an audio record, an image, or a video.

4. The apparatus of claim 1, wherein the natural language similarity is a cosine similarity.

5. The apparatus of claim 1, wherein the content is first content, and wherein the at least one processor is to train the first machine-learning model based on training data including second content.

6. The apparatus of claim 1, wherein the content is first content, and wherein the at least one processor is to train the second machine-learning model based on second training data including at least one of second content or third content.

7. The apparatus of claim 1, wherein at least one of the first machine-learning model or the second machine-learning model is a neural network, a Learning-to-Rank model, a Long Short-Term Memory model, or a Transformer model.

8. The apparatus of claim 1, wherein the at least one processor is to execute the machine-readable instructions to:
generate an application including a user interface to obtain the query and a telemetry agent to generate telemetry data based on the query; and
transmit the application to the computing device via a network, the computing device to execute the application in response to the transmitting.

9. The apparatus of claim 1, wherein the content is first content, the natural language similarity is a first natural language similarity, and wherein the at least one processor is to execute the machine-readable instructions to:
encode one or more portions of second content;
organize the one or more portions based on a second natural language similarity of the one or more portions;
associate metadata with the one or more portions; and
store an association of the metadata and a first one of the one or more portions in a database, the related search results based on the association.

10. The apparatus of claim 1, wherein the at least one processor is to execute the machine-readable instructions to determine similarities of ones of the related search results to others of the related search results to generate the rankings.

11. The apparatus of claim 10, wherein the generated rankings are based on similarities between pairs of ones of the related search results.

12. The apparatus of claim 1, wherein the second machine-learning model is to generate the rankings in response to the query for the content.

13. The apparatus of claim 1, wherein the related search results are extracted in response to the query for the content.

14. The apparatus of claim 1, wherein the second machine-learning model is to solely utilize output from the first machine-learning model as input thereto.

15. The apparatus of claim 1, wherein the pattern corresponds to at least one of a concept or an idea that is represented by the contextually similar text data.

16. The apparatus of claim 1, wherein the at least one processor is to execute the machine-readable instructions to associate at least one of a concept or an idea that is represented by the contextually similar text data with the contextually similar text data.

17. At least one computer readable medium comprising instructions that, when executed, cause at least one processor to at least:
tokenize text from content into text portions, the text portions including a first text portion and a second text portion;
execute a first machine-learning model with the text portions as input to the first machine-learning model to encode the first text portion to define a first vector and encode the second text portion to define a second vector, the first machine-learning model to output the first vector and the second vector, the first machine-learning model trained with contextually similar text data and context corresponding to the contextually similar text data, the context associated with a pattern represented by the contextually similar text data;
determine, based on a comparison between the first vector and the second vector, a natural language similarity between the first text portion and the second text portion;
in response to the natural language similarity satisfying a threshold, combine the first text portion and the second text portion to generate a third text portion;
encode the third text portion to define a third vector different from the first vector and the second vector;
cause storage of the third vector to define a vector database;
query the vector database to extract related search results from the vector database by comparing the third vector to a query vector corresponding to a query; and
execute a second machine-learning model different from the first machine-learning model with the related search results as input to the second machine-learning model to generate rankings of the related search results as output from the second machine-learning model for presentation on a computing device, the second machine-learning model trained with data corresponding to at least one query and search results associated with the at least one query.

18. The at least one computer readable medium of claim 17, wherein the natural language similarity is a cosine similarity.

19. The at least one computer readable medium of claim 17, wherein the content is first content, and wherein the instructions, when executed, cause the at least one processor to train the first machine-learning model based on training data including second content.

20. The at least one computer readable medium of claim 19, wherein the instructions, when executed, cause the at least one processor to train the second machine-learning model based on second training data including at least one of the second content or third content.

21. The at least one computer readable medium of claim 17, wherein the instructions, when executed, cause the at least one processor to:
generate an application including a user interface to obtain the query and a telemetry agent to generate telemetry data based on the query; and
transmit the application to the computing device via a network, the computing device to execute the application in response to the transmitting.

22. The at least one computer readable medium of claim 17, wherein the content is first content, the natural language similarity is a first natural language similarity, and wherein the instructions, when executed, cause the at least one processor to:
encode one or more portions of second content;
organize the one or more portions based on a second natural language similarity of the one or more portions;
associate metadata with the one or more portions; and
store an association of the metadata and a first one of the one or more portions in a database, the related search results based on the association.

23. An apparatus comprising:
means for tokenizing text from content into text portions, the text portions including a first text portion and a second text portion;
means for executing a first machine-learning model with the text portions as input to encode the first text portion to define a first vector and encode the second text portion to define a second vector, the first machine-learning model to output the first vector and the second vector, the first machine-learning model trained with contextually similar text data and context corresponding to the contextually similar text data, the context associated with a pattern represented by the contextually similar text data;
means for determining, based on a comparison between the first vector and the second vector, a natural language similarity between the first text portion and the second text portion;
means for combining, in response to the natural language similarity satisfying a threshold, the first text portion and the second text portion to generate a third text portion;
means for encoding the third text portion to define a third vector different from the first vector and the second vector;
means for causing storage of the third vector to define a vector database;
means for querying the vector database to extract related search results from the vector database by comparing the third vector to a query vector corresponding to a query; and
means for executing a second machine-learning model different from the first machine-learning model with the related search results as input to the second machine-learning model to generate rankings of the related search results as output from the second machine-learning model for presentation on a computing device, the second machine-learning model trained with data corresponding to at least one query and search results associated with the at least one query.

24. The apparatus of claim 23, wherein the natural language similarity is a cosine similarity.

25. The apparatus of claim 23, wherein the content is first content, and further including means for training to train the first machine-learning model based on training data including second content different from the first content.

26. The apparatus of claim 25, wherein the means for training is to train the second machine-learning model based on second training data including at least one of the second content or third content.

27. The apparatus of claim 23, wherein the content is first content, the natural language similarity is a first natural language similarity, and wherein:
   the means for executing the first machine-learning model is to encode one or more portions of second content;
   the means for querying is to organize the one or more portions based on a second natural language similarity of the one or more portions; and
   the means for querying the vector database is to:
      associate metadata with the one or more portions; and
      store an association of the metadata and a first one of the one or more portions in a database, the related search results based on the association.

* * * * *

UNITED STATES PATENT AND TRADEMARK OFFICE
CERTIFICATE OF CORRECTION

Page 1 of 1

PATENT NO.       : 12,353,456 B2
APPLICATION NO.  : 17/240679
DATED            : July 8, 2025
INVENTOR(S)      : Banda It is certified that error appears in the above-identified patent and that said Letters Patent is hereby corrected as shown below:

In the Drawings

Sheet 8, (Fig. 8), Field 804, Delete: "Johnstown Avademy," and Insert: --Johnstown Academy,--

Signed and Sealed this
Twenty-sixth Day of August, 2025

Coke Morgan Stewart
*Acting Director of the United States Patent and Trademark Office*